United States Patent
Creighton

(10) Patent No.: US 12,386,200 B2
(45) Date of Patent: Aug. 12, 2025

(54) METHOD FOR OBTAINING CONTACT LENSES WITH DYNAMICALLY CONTROLLED SAGITTA AND CLEARANCE

(71) Applicant: Bausch & Lomb Incorporated, Rochester, NY (US)

(72) Inventor: Charles H. Creighton, West Seneca, NY (US)

(73) Assignee: Bausch & Lomb Incorporated, Rochester, NY (US)

( * ) Notice: Subject to any disclaimer, the term of this patent is extended or adjusted under 35 U.S.C. 154(b) by 601 days.

(21) Appl. No.: 17/867,350

(22) Filed: Jul. 18, 2022

(65) Prior Publication Data

US 2023/0084398 A1   Mar. 16, 2023

Related U.S. Application Data

(60) Continuation of application No. 16/826,434, filed on Mar. 23, 2020, now Pat. No. 11,391,964, which is a division of application No. 15/165,044, filed on May 26, 2016, now Pat. No. 10,598,955.

(60) Provisional application No. 62/180,004, filed on Jun. 15, 2015, provisional application No. 62/168,148, filed on May 29, 2015.

(51) Int. Cl.
   *G02C 7/02* (2006.01)
   *B29D 11/00* (2006.01)
   *B29K 33/00* (2006.01)
   *G02C 7/04* (2006.01)

(52) U.S. Cl.
   CPC ........ *G02C 7/028* (2013.01); *B29D 11/00086* (2013.01); *G02C 7/024* (2013.01); *G02C 7/027* (2013.01); *G02C 7/04* (2013.01); *G02C 7/047* (2013.01); *B29K 2033/12* (2013.01)

(58) Field of Classification Search
   CPC ........ G02C 7/024; G02C 7/027; G02C 7/028; G02C 7/04; G02C 7/047; B29D 11/00086
   See application file for complete search history.

(56) References Cited

U.S. PATENT DOCUMENTS

| | | | |
|---|---|---|---|
| 10,598,955 B2 * | 3/2020 | Creighton | G02C 7/028 |
| 11,391,964 B2 * | 7/2022 | Creighton | G02C 7/024 |
| 2007/0242216 A1 * | 10/2007 | Dootjes | B29D 11/00076 351/159.73 |
| 2010/0271589 A1 * | 10/2010 | Legerton | G02C 7/047 351/159.02 |

* cited by examiner

*Primary Examiner* — Cara E Rakowski
(74) *Attorney, Agent, or Firm* — Andrew J. Anderson, Esq; Harter Secrest & Emery LLP

(57) ABSTRACT

The disclosure generally describes methods, systems and products relating to the development and manufacture of scleral contact lenses. A number of dimensions for the scleral lens is generated based on control points and attendant curvature parameters. Any change to one or more of the curve parameters imparts an improved anterior and posterior surface of the scleral lens and associated thickness, while undesired modifications to control points and other curve parameters remain static inasmuch as the sagittal depth component is an input parameter of the present disclosure.

20 Claims, 7 Drawing Sheets

The Dynamic Curve in action ensures only intentional changes to lens fit.

METHOD FOR OBTAINING CONTACT LENSES WITH DYNAMICALLY CONTROLLED SAGITTA AND CLEARANCE

RELATED APPLICATIONS

This application claims the benefit of priority to U.S. Provisional Patent Application Nos. 62/168,148 filed on May 29, 2015 and 62/180,004 filed on Jun. 15, 2015, the contents of which are relied upon and incorporated herein by reference in their entirety.

BACKGROUND OF THE INVENTION

The present technology relates generally to the field of contact lenses. More specifically, the present technology relates to the development, manufacture and adjustment of scleral lenses for improved ocular function relating to a diseased or disordered state and/or for simply improving the sight of an individual in need thereof.

FIELD OF THE INVENTION

The following description is provided to assist the understanding of the reader. None of the information provided or references cited is admitted to be prior art to the present invention.

Medical indications relating to ophthalmic aberrations, diseases or conditions affect the proper functioning of the eye and its constituent parts, e.g., the retina, optic nerve, cornea, vitreous, pupil and/or sclera, among other interrelated and integrated components. Such indications, for example, irregular corneas, light sensitivity, injuries to the eye, dry eye, kerotanconjuctivis sicca, microphthalmia, ocular pemphigoid, keratoconus, diabetic retinopathy, cataracts, retinitis pigmentosa, glaucoma, choroidal neovascularization, and oxygen-induced retinopathy, and/or other pathological conditions of the eye, underscore the manifold—delicate—interfaces linked to an initial diagnosis of such conditions or states, a recommended therapeutic course of action, e.g., corrective contact lenses, the manufacture of such lenses, and any subsequent modification to improve alignment or any other parameter that impacts the lens-eye interaction. Available techniques, accurate medical information and skill afforded to the lens fitter are coterminous with the foregoing considerations inasmuch as the manufacture of an appropriately configured therapeutic lens is the de facto point-of-care with respect to lens treatment of the eye Imprecision at this stage, however, imparts an almost constant discomfort for the patient, which hinders compliance regardless of disease etiology.

In concert with the foregoing, ocular inconsistencies that causes images on the retina to be blurred and/or have less detail than images on an otherwise consistent (or healthy) retina are common conditions associated with the human eye. Refractive errors, moreover, are ascribed to lower order inconsistencies or aberrations, which precipitate abnormalities such as, for example, myopia and/or hyperopia, among other conditions. Higher order aberrations are less common, but nevertheless alter refractions of light as it travels through the pupil. For example, a higher order aberration may be comma, spherical aberration, trefoil, and other related disorders, which can cause symptomatic glaring, irregular image patterning, and double vision, among other related conditions.

Lower order aberrations may be reduced or eliminated by positioning a corneal contact lens on the eye, which are accordingly configured to engage the corneal area without resting on the pupil. Higher order aberrations, however, may require additional and/or alternative medical modalities. Furthermore, corneal contact lenses may in fact facilitate the generation of additional higher order aberrations by altering the light/wave properties as it traverses the corneal contact lens and the pupil.

In contrast to the corneal contacts noted above, scleral contact lenses are configured to engage the scleral (white) portion of the eye without resting on the cornea or pupil. By perfecting control point parameters and sagittal clearance of scleral contact lenses, the "vault" of the lens—over the cornea and pupil, when properly adjusted—remediates the medical indication. Current methods and systems of manufacturing scleral lenses are imprecise and inject unnecessary complexity into the lens-fitting process, which consequently confounds accurate control point and clearance adjustment. The present technology addresses these and other concerns associated with the process of manufacturing efficacious and comfortable fitting scleral lenses.

BRIEF SUMMARY OF THE INVENTION

The present methods and systems relate to the improved development, manufacture and adjustment of scleral lenses for improved ocular function relating to a diseased or disordered state and/or for simply improving the sight of an individual in need thereof.

In one aspect, the present disclosure provides a method of manufacturing a contact lens, comprising: determining one or more control points of the contact lens that require adjusting; and altering the one or more segment parameters when the adjustment is required, wherein each of the one or more segment parameters comprise components selected from the group consisting of at least one sagittal component, at least one radius component, and at least one chord diameter component, and wherein a change in one or more of the components for each of the one or more segment parameters is associated with a corresponding change in the one or more control points, and further wherein changes to any single segment parameter modify the contact lens at a desired control point of the one or more control points and do not modify the contact lens at undesired control points of the one or more control points.

In illustrative embodiments, the present disclosure further provides a predicate lens as a reference for the step (a) adjusting. In some embodiments, the one or more control points are selected from the group consisting of central vault clearance, mid-peripheral clearance, limbal clearance and scleral alignment angle, and combinations thereof. In illustrative embodiments, the one or more control points are adjusted by altering the segment parameters, and wherein the segment parameters are selected from the group consisting of base curve, dynamic curve, limbal clearance curve and peripheral curve, and combinations thereof. In illustrative embodiments, the sagittal component of the base curve, the dynamic curve and the limbal clearance curve comprise the total sagittal clearance for the contract lens. In illustrative embodiments, the changes to the sagittal component of the peripheral curve do not impact the total sagittal clearance. In illustrative embodiments, the changes to the peripheral curve correspond to changes in the scleral alignment angle control point.

In some embodiments, the changes to the dynamic curve sagittal component and/or the total sagittal clearance correspond to changes in the central vault clearance control point. In illustrative embodiments, the changes to the dynamic curve sagittal component and/or the mid-peripheral sagittal component correspond to changes in the mid-peripheral clearance control point. In illustrative embodiments, the changes to the dynamic curve sagittal component and/or the limbal sagittal component correspond to changes in the limbal clearance control point. In illustrative embodiments, the contact lens is a scleral contact lens. In illustrative embodiments, the scleral contact lens is a large-diameter gas permeable lens that engages the sclera of an eye. In illustrative embodiments, the scleral contact lens is a rigid gas permeable contact lens or a hybrid contact lens. In illustrative embodiments, the hybrid contact lens comprises a rigid gas permeable central core and soft hydrophilic penumbra.

In suitable embodiments, the rigid gas permeable material is selected from the group consisting of an oxygen permeable polymer, fluorosilicone acrylate, silicone acrylate, fluorosilicone acrylate with rigid silicone-hydrogel, fluorosilicone acrylate with hydrophilic surface, fluoro-siloxane acrylate, siloxane acrylate, hexafocon A, enflufocon A, enflufocon B, aliphatic fluoroitaconate siloxanyl methacrylate copolymers, hioxifilcon B, hioxifilcon D, hioxifilcon A, polymacon, methafilcon A, 2-hydroxyethyl methacrylate (2-HEMA), 2,3-dihydroxypropyl methacrylate (Glycerol Methacrylate, GMA), polymethyl methacrylate (PMMA), acrylamide, poly(hyaluronic acid), poly(sodium alginate), poly(ethylene glycol) (PEG), poly(lactic acid) polymers, poly(glycolic acid) polymers, poly(lactide-co-glycolides) (PLGA), poly(urethanes), poly(siloxanes) or silicones, poly(ethylene), poly(vinyl pyrrolidone), poly(2-hydroxy ethyl methacrylate), poly(N-vinyl pyrrolidone), poly(methyl methacrylate), poly(vinyl alcohol) (PVA), poly(acrylic acid), poly(vinyl acetate), polyacrylamide, poly(ethylene-co-vinyl acetate), poly(methacrylic acid), polylactic acid (PLA), poly(L-lactide) (PLLA), polyglycolic acids (PGA), polyamides, polyanhydrides, poly(ethylene-co-vinyl alcohol) (EVOH), polycaprolactone, polyvinylhydroxide, poly(ethylene oxide) (PEO), polyorthoesters, poly(N-isopropylacrylamide) (PIPAAm), N,N-dimethylaminopropyl acrylamide (DMAPAAm), poly(N-acryloylpiperidine)-cysteamine (pAP), PIPAAM-carboxymethyl dextran benzylamide sulfonate/sulfate (PIPAAm-CMDBS), N,N-methylene-bis-acrylamide cross-linked polymer, PIPAAm-PEG N-isopropylacrylamide, N,N-dimethylacrylamide, 2-hydroxyethylmethacrylate, N-hydroxyethyl acrylamide, N-vinyl-2-pyrrolidone, 4-pentenoic acid, N-isopropylmethacrylamide, N-methoxymethyl-N-isopropylacrylamide, 2-(dimethylmaleimido)-N-ethylacrylamide, N,N-methylene-bis-acrylamide cross-linked polymer, and PIPAAm-PEG, or combinations thereof including polymers, co-polymers and/or terpolymers and combinations thereof.

In illustrative embodiments, the rigid gas permeable material is selected from the group consisting of an oxygen permeable polymer, fluorosilicone acrylate, silicone acrylate, fluorosilicone acrylate with rigid silicone-hydrogel, fluorosilicone acrylate with hydrophilic surface, fluoro-siloxane acrylate, siloxane acrylate, hexafocon A, enflufocon A, enflufocon B, aliphatic fluoroitaconate siloxanyl methacrylate copolymers, hioxifilcon B, hioxifilcon D, hioxifilcon A, polymacon, methafilcon A, 2-hydroxyethyl methacrylate (2-HEMA), 2,3-dihydroxypropyl methacrylate (Glycerol Methacrylate, GMA), polymethyl methacrylate (PMMA), acrylamide, poly(hyaluronic acid), poly(sodium alginate), poly(ethylene glycol) (PEG), poly(lactic acid) polymers, poly(glycolic acid) polymers, poly(lactide-co-glycolides) (PLGA), poly(urethanes), poly(siloxanes) or silicones, poly(ethylene), poly(vinyl pyrrolidone), poly(2-hydroxy ethyl methacrylate), poly(N-vinyl pyrrolidone), poly(methyl methacrylate), poly(vinyl alcohol) (PVA), poly(acrylic acid), poly(vinyl acetate), polyacrylamide, poly(ethylene-co-vinyl acetate), poly(methacrylic acid), polylactic acid (PLA), poly(L-lactide) (PLLA), polyglycolic acids (PGA), polyamides, polyanhydrides, poly(ethylene-co-vinyl alcohol) (EVOH), polycaprolactone, polyvinylhydroxide, poly(ethylene oxide) (PEO), polyorthoesters, poly(N-isopropylacrylamide) (PIPAAm), N,N-dimethylaminopropyl acrylamide (DMAPAAm), poly(N-acryloylpiperidine)-cysteamine (pAP), PIPAAM-carboxymethyl dextran benzylamide sulfonate/sulfate (PIPAAm-CMDBS), N,N-methylene-bis-acrylamide cross-linked polymer, PIPAAm-PEG N-isopropylacrylamide, N,N-dimethylacrylamide, 2-hydroxyethylmethacrylate, N-hydroxyethyl acrylamide, N-vinyl-2-pyrrolidone, 4-pentenoic acid, N-isopropylmethacrylamide, N-methoxymethyl-N-isopropylacrylamide, 2-(dimethylmaleimido)-N-ethylacrylamide, N,N-methylene-bis-acrylamide cross-linked polymer, and PIPAAm-PEG, or combinations thereof including polymers, co-polymers and/or terpolymers and combinations thereof.

In suitable embodiments, the soft hydrophilic penumbra is selected from the group consisting of an oxygen permeable polymer, fluorosilicone acrylate, silicone acrylate, fluorosilicone acrylate with rigid silicone-hydrogel, fluorosilicone acrylate with hydrophilic surface, fluoro-siloxane acrylate, siloxane acrylate, hexafocon A, enflufocon A, enflufocon B, aliphatic fluoroitaconate siloxanyl methacrylate copolymers, hioxifilcon B, hioxifilcon D, hioxifilcon A, polymacon, methafilcon A, 2-hydroxyethyl methacrylate (2-HEMA), 2,3-dihydroxypropyl methacrylate (Glycerol Methacrylate, GMA), polymethyl methacrylate (PMMA), acrylamide, poly(hyaluronic acid), poly(sodium alginate), poly(ethylene glycol) (PEG), poly(lactic acid) polymers, poly(glycolic acid) polymers, poly(lactide-co-glycolides) (PLGA), poly(urethanes), poly(siloxanes) or silicones, poly(ethylene), poly(vinyl pyrrolidone), poly(-hydroxy ethyl methacrylate), poly(N-vinyl pyrrolidone), poly(methyl methacrylate), poly(vinyl alcohol) (PVA), poly(acrylic acid), poly(vinyl acetate), polyacrylamide, poly(ethylene-co-vinyl acetate), poly(methacrylic acid), polylactic acid (PLA), poly(L-lactide) (PLLA), polyglycolic acids (PGA), polyamides, polyanhydrides, poly(ethylene-co-vinyl alcohol) (EVOH), polycaprolactone, polyvinylhydroxide, poly(ethylene oxide) (PEO), polyorthoesters, poly(N-isopropylacrylamide) (PIPAAm), N,N-dimethylaminopropyl acrylamide (DMAPAAm), poly(N-acryloylpiperidine)-cysteamine (pAP), PIPAAM-carboxymethyl dextran benzylamide sulfonate/sulfate (PIPAAm-CMDBS), N,N-methylene-bis-acrylamide cross-linked polymer, PIPAAm-PEG N-isopropylacrylamide, N,N-dimethylacrylamide, 2-hydroxyethylmethacrylate, N-hydroxyethyl acrylamide, N-vinyl-2-pyrrolidone, 4-pentenoic acid, N-isopropylmethacrylamide, N-methoxymethyl-N-isopropylacrylamide, 2-(dimethylmaleimido)-N-ethylacrylamide, N,N-methylene-bis-acrylamide cross-linked polymer, and PIPAAm-PEG, or combinations thereof including polymers, co-polymers and/or terpolymers and combinations thereof.

In illustrative embodiments, the contact lens is therapeutic for ophthalmic indications selected from the group consisting of irregular corneas, improving normal cornea function, improving vision, reducing pain, reducing light sensitivity, disorders or injuries to the eye, dry eye, kerotanconjuctivis sicca, microphthalmia, ocular pemphigoid, keratoconus, corneal ectasia, Stevens-Johnson syndrome, Sjögren's syndrome, aniridia, neurotrophic keratitis, autoimmune diseases, chronic graft-versus-host disease, post-LASIK dry eye, irregular astigmatism, complications post-LASIK surgery, higher order eye aberrations, complications post-corneal transplant, pellucid degeneration, surgical complications, distorted corneal implants, corneal grafts and chemical or burn injuries, and combinations thereof.

In some embodiments, the base curve, dynamic curve, limbal clearance curve and peripheral curve are the segment parameters for a spherical curve. In illustrative embodiments, the base curve, dynamic curve, limbal clearance curve and peripheral curve are the segment parameters for an aspheric curve. In illustrative embodiments, the aspheric curve is selected from the group consisting of conical sections, polynomials, splines, straight lines, angled lines, tapered lines, polygonal curves, rectangular, square, circular, diagonal, concentric, patterned, perimetric, hexagonal, or triangular configurations, or any free form line possessing a start point, an end point, and connects two defined points in space, and/or other shapes that are congruent for use as a sagittal component. In illustrative embodiments, the methods further comprise one or more additional segment parameter curves and/or one or more additional control points. In suitable embodiments, the one or more additional segment parameter curves and/or one or more additional control point sites selected from the group consisting of one or more curves and/or sagittal components, wherein all the curves and/or sagittal components are defined other than the dynamic curve, and wherein the dynamic curve is calculated to achieve the desired total sagittal clearance. In illustrative embodiments, the dynamic curve is calculated as the quotient of the sagittal component divided by the radius component.

In one aspect, the present technology provides for a method of adjusting scleral contact lens clearance at a desired site without altering the clearance at undesired sites, the method comprising: providing a predicate lens; determining one or more control point sites of the predicate lens that require adjusting; and altering the one or more parameters when the adjustment is required, wherein each of the one or more segment parameters comprise components selected from the group consisting of at least one sagittal component, at least one radius component, and at least one chord diameter component, and wherein a change in one or more of the components for each of the one or more segment parameters is associated with a corresponding change at the one or more control point sites, and further wherein changes to any single segment parameter modify the contact lens at the desired control point site of the one or more control point sites and do not modify the contact lens at undesired control point sites of the one or more control point sites. In illustrative embodiments, the one or more control point sites are selected from the group consisting of central vault clearance sites, mid-peripheral clearance sites, limbal clearance sites and scleral alignment angle sites, and combinations thereof.

In illustrative embodiments, the one or more control point sites are adjusted by altering the segment parameters, and wherein the segment parameters are selected from the group consisting of base curve, dynamic curve, limbal clearance curve and peripheral curve, and combinations thereof. In illustrative embodiments, the sagittal component of the base curve, the dynamic curve and the limbal clearance curve comprise the total sagittal clearance for the contract lens. In illustrative embodiments, the changes to the sagittal component of the peripheral curve do not impact the total sagittal clearance. In illustrative embodiments, the changes to the peripheral curve correspond to changes in the scleral alignment angle control point sites.

In suitable embodiments, the changes to the dynamic curve sagittal component and/or the total sagittal clearance correspond to changes in the central vault clearance control point sites. In illustrative embodiments, the changes to the dynamic curve sagittal component and/or the base curve sagittal component correspond to changes in the mid-peripheral clearance control point sites. In illustrative embodiments, the changes to the dynamic curve sagittal component and/or the limbal sagittal component correspond to changes in the limbal clearance control point sites. In some embodiments, the contact lens is a scleral contact lens.

In illustrative embodiments, the scleral contact lens is a large-diameter gas permeable lens that engages the sclera of an eye. In illustrative embodiments, the scleral contact lens is a rigid gas permeable contact lens or a hybrid contact lens. In illustrative embodiments, the hybrid contact lens comprises a rigid gas permeable central core and soft hydrophilic penumbra. In illustrative embodiments, the rigid gas permeable and/or soft material is selected from the group as recited above. In illustrative embodiments, the contact lens is therapeutic for ophthalmic indications selected from the group consisting of irregular corneas, improving normal cornea function, improving vision, reducing pain, reducing light sensitivity, disorders or injuries to the eye, dry eye, keratanconjuctivis sicca, microphthalmia, ocular pemphigoid, keratoconus, corneal ectasia, Stevens-Johnson syndrome, Sjögren's syndrome, aniridia, neurotrophic keratitis, autoimmune diseases, chronic graft-versus-host disease, post-LASIK dry eye, irregular astigmatism, complications post-LASIK surgery, higher order eye aberrations, complications post-corneal transplant, pellucid degeneration, surgical complications, distorted corneal implants, corneal grafts and chemical or burn injuries, and combinations thereof.

In some embodiments, the base curve, dynamic curve, limbal clearance curve and peripheral curve are the segment parameters for a spherical curve. In illustrative embodiments, the base curve, dynamic curve, limbal clearance curve and peripheral curve are the segment parameters for an aspheric curve. In illustrative embodiments, the aspheric curve is selected from the group consisting of conical sections, polynomials, splines, straight lines, angled lines, tapered lines, polygonal curves, rectangular, square, circular, diagonal, concentric, patterned, perimetric, hexagonal, or triangular configurations, or any free form line possessing a start point, an end point, and connects two defined points in space, and/or other shapes that are congruent for use as a sagittal component.

In illustrative embodiments, the present technology further comprises one or more additional segment parameter curves and/or one or more additional control point sites. In illustrative embodiments, the one or more additional segment parameter curves and/or one or more additional control point sites selected from the group consisting of one or more curves and/or sagittal components, wherein all the curves and/or sagittal components are defined other than the dynamic curve, and wherein the dynamic curve is calculated to achieve the desired total sagittal clearance. In illustrative embodiments, the dynamic curve is calculated as the quotient of the sagittal component divided by the radius component.

In one aspect, the present disclosure provides for a system for customizing at least one contact lens at one or more desired sites without altering the at least one contact lens at undesired sites, the system comprising: at least one predicate lens to function as a reference for determining one or more control point sites of the predicate lens that require adjusting; at least one scleral contact lens substrate for forming an adjusted scleral contact lens; a device for altering one or more segment parameters of the at least one scleral contact lens substrate when the adjusting is required, wherein each of the one or more segment parameters comprise components selected from the group consisting of at least one sagittal component, at least one radius component, and at least one chord diameter component, and wherein a change in one or more of the components for each of the one or more segment parameters is associated with a corresponding change at the one or more control point sites, and further wherein changes to any single segment parameter modify the at least one scleral contact lens substrate at the desired control point site of the one or more control point sites and do not modify the at least one scleral contact lens substrate at undesired control point sites of the one or more control point sites; and the at least one customized scleral contact lens formed from the at least one scleral contact lens substrate that has been adjusted.

In illustrative embodiments, the one or more control point sites are selected from the group consisting of central vault clearance sites, mid-peripheral clearance sites, limbal clearance sites and scleral alignment angle sites, and combinations thereof. In illustrative embodiments, the one or more control point sites are adjusted by altering the segment parameters, and wherein the segment parameters are selected from the group consisting of base curve, dynamic curve, limbal clearance curve and peripheral curve, and combinations thereof.

In suitable embodiments, the sagittal component of the base curve, the dynamic curve and the limbal clearance curve comprise the total sagittal clearance for the customized scleral contact lens. In illustrative embodiments, the changes to the sagittal component of the peripheral curve do not impact the total sagittal clearance. In illustrative embodiments, the changes to the peripheral curve correspond to changes in the scleral alignment angle control point sites. In illustrative embodiments, the changes to the dynamic curve sagittal component and/or the total sagittal clearance correspond to changes in the central vault clearance control point sites.

In illustrative embodiments, the changes to the dynamic curve sagittal component and/or the base curve sagittal component correspond to changes in the mid-peripheral clearance control point sites. In illustrative embodiments, the changes to the dynamic curve sagittal component and/or the limbal sagittal component correspond to changes in the limbal clearance control point sites.

In some embodiments, the at least one predicate lens, the at least one scleral contact lens substrate, and/or the at least one customized scleral contact lens are composed of materials selected from the group of material provided above. In illustrative embodiments, the at least one customized scleral contact lens is a large-diameter gas permeable lens that engages the sclera of an eye. In illustrative embodiments, the at least one customized scleral contact lens is a rigid gas permeable contact lens or a hybrid contact lens. In illustrative embodiments, the hybrid contact lens comprises a rigid gas permeable central core and soft hydrophilic penumbra.

In illustrative embodiments, the rigid gas permeable material and/or the soft hydrophilic penumbra is selected from the group of materials indicated above. In illustrative embodiments, the contact lens is therapeutic for ophthalmic indications selected from the group consisting of irregular corneas, improving normal cornea function, improving vision, reducing pain, reducing light sensitivity, disorders or injuries to the eye, dry eye, kerotanconjuctivis sicca, microphthalmia, ocular pemphigoid, keratoconus, corneal ectasia, Stevens-Johnson syndrome, Sjögren's syndrome, aniridia, neurotrophic keratitis, autoimmune diseases, chronic graft-versus-host disease, post-LASIK dry eye, irregular astigmatism, complications post-LASIK surgery, higher order eye aberrations, complications post-corneal transplant, pellucid degeneration, surgical complications, distorted corneal implants, corneal grafts and chemical or burn injuries, and combinations thereof.

In suitable embodiments, the base curve, dynamic curve, limbal clearance curve and peripheral curve are the segment parameters for a spherical curve. In illustrative embodiments, the base curve, dynamic curve, limbal clearance curve and peripheral curve are the segment parameters for an aspheric curve. In illustrative embodiments, the aspheric curve is selected from the group consisting of conical sections, polynomials, splines, straight lines, angled lines, tapered lines, polygonal curves, rectangular, square, circular, diagonal, concentric, patterned, perimetric, hexagonal, or triangular configurations, or any free form line possessing a start point, an end point, and connects two defined points in space, and/or other shapes that are congruent for use as a sagittal component.

In illustrative embodiments, the present technology further comprises one or more additional segment parameter curves and/or one or more additional control point sites. In illustrative embodiments, the one or more additional segment parameter curves and/or one or more additional control point sites selected from the group consisting of one or more curves and/or sagittal components, wherein all the curves and/or sagittal components are defined other than the dynamic curve, and wherein the dynamic curve is calculated to achieve the desired total sagittal clearance. In illustrative embodiments, the dynamic curve is calculated as the quotient of the sagittal component divided by the radius component. In illustrative embodiments, the device is selected from the group consisting of one or more cutting lathe machines. In some embodiments the device is selected from a lathe cutting apparatus, computer-guided lathe cutting, manual lathe cutting, precision lathe cutting machines, and/or lathe polishing machines for hard contacts and/or any combination thereof.

In one aspect, the present disclosure provides for a method of designing a lens with dynamic curve comprising: altering one or more segment parameters, wherein each of the one or more segment parameters comprise components selected from the group consisting of at least one sagittal component, at least one radius component, and at least one chord diameter component, and wherein a change in one or more of the components for each of the one or more segment parameters is associated with a corresponding change in the one or more control points, and further wherein changes to any single segment parameter modify the contact lens at a desired control point of the one or more control points and do not modify the contact lens at undesired control points of the one or more control points.

In some embodiments, the sagittal component of a dynamic curve is an input parameter used to determine one or more control points of the contact lens that require adjusting. In further embodiments, the methods also comprise providing a predicate lens as a reference lens. In suitable embodiments, the one or more control points are selected from the group consisting of central vault clearance, mid-peripheral clearance, limbal clearance and scleral alignment angle, and combinations thereof. In illustrative embodiments, the one or more control points are adjusted by altering the segment parameters, and wherein the segment parameters are selected from the group consisting of base curve, dynamic curve, limbal clearance curve and peripheral curve, and combinations thereof.

In suitable embodiments, the sagittal component of the base curve, the dynamic curve and the limbal clearance curve comprise the total sagittal clearance for the contract lens. In some embodiments, the changes to the sagittal component of the peripheral curve do not impact the total sagittal clearance. In some embodiments, the changes to the peripheral curve correspond to changes in the scleral alignment angle control point. In some embodiments, the changes to the dynamic curve sagittal component and/or the total sagittal clearance correspond to changes in the central vault clearance control point.

In one aspect, the present disclosure provides a method of designing a dynamic curve lens comprising providing input data for one or more segment parameters, wherein each of the one or more segment parameters comprise components selected from the group consisting of at least one sagittal component, at least one radius component, and at least one chord diameter component, and wherein a change in one or more of the components for each of the one or more segment parameters is associated with a corresponding change in the one or more control points, and further wherein changes to any single segment parameter modify the contact lens at a desired control point of the one or more control points and do not modify the contact lens at undesired control points of the one or more control points; and adjusting at least one sagittal component of a dynamic curve from the one or more segment parameters.

In suitable embodiments, the sagittal component of a dynamic curve is an input parameter based on an algorithm. Moreover, in some embodiments, the Total Sagittal of the lens ($S_{TOTAL}$) is an input parameter based on an algorithm, wherein in such embodiments, following the algorithm the sagittal component of a dynamic curve is calculated. In suitable embodiments, the steps are performed on a computer using an algorithm on computer readable media. In suitable embodiments, the steps or processes are automated. In some embodiments, the automation is performed using a computer. In illustrative embodiments, the algorithm is defined in the table:

| Notation | Parameter | Formula/Calculation |
| --- | --- | --- |
| (SA) | Base Curve | = RA − sqrt(RA^2 − (DA/2)^2) |
| (SC) | Limbal Clearance Curve | = RC − sqrt(RC^2 − (DC/2)^2) − RC − sqrt(RC^2 − (DB/2)^2) |
| (SD) | Peripheral Curve | = RD − sqrt(RD^2 − DD/2)^2) − RD − sqrt(RC^2 − (DC/2)^2) |
| (SB) | Dynamic Curve Sagittal Component | = Stotal − SD − SC − SA |
| (RB) | Dynamic Curve Radius | = SQRT(((DA/2)^2) + ((((((DB/2)^2) − ((DA/2)^2)) + (SB^2))/(2*SB))^2))) |

The foregoing summary is illustrative only and is not intended to be in any way limiting. In addition to the illustrative aspects, embodiments, and features described above, further aspects, embodiments, and features will become apparent by reference to the following detailed description.

DETAILED DESCRIPTION

Figure 1A:
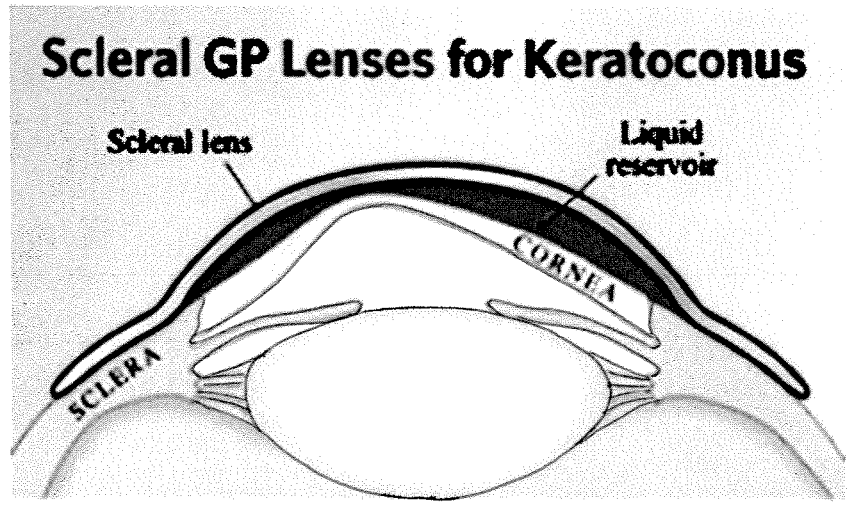
FIGS. 1A-1B depict schematic representations of various components of a scleral contact lens and assessment of fitting variables.

In the description that follows, a number of terms are used extensively. Definitions are provided to facilitate understanding of the invention. The terms described below are more fully defined by reference to the specification as a whole. Units, prefixes, and symbols may be denoted in their accepted S.I. format. It is to be appreciated that certain aspects, modes, embodiments, variations and features of the invention are described below in various levels of detail in order to provide a substantial understanding of the present invention.

In practicing the present invention, many conventional techniques in optometry, optometric, optometry, ophthalmic, molecular biology, protein biochemistry, cell biology, immunology, microbiology and other related engineering and scientific disciplines are employed. These techniques are well-known and are explained in, e.g., *Contact Lenses' Fabrication Tables—for the clinician, and for the laboratory technician, by Charles Patrick Creighton* ©1964 as revised in ©1976; Pub: Alden Optical Laboratories, Inc.; *Current Protocols in Molecular Biology*, Vols. I-III, Ausubel, Ed. (1997); Sambrook et al., *Molecular Cloning: A Laboratory Manual*, Second Ed. (Cold Spring Harbor Laboratory Press, Cold Spring Harbor, NY, 1989); *DNA Cloning: A Practical Approach*, Vols. I and II, Glover, Ed. (1985); *Oligonucleotide Synthesis*, Gait, Ed. (1984); *Nucleic Acid Hybridization*, Hames & Higgins, Eds. (1985); *Transcription and Translation*, Hames & Higgins, Eds. (1984); *Animal Cell Culture, Freshney*, Ed. (1986); *Immobilized Cells and Enzymes* (IRL Press, 1986); Perbal, *A Practical Guide to Molecular Cloning*; the series, *Meth. Enzymol.*, (Academic Press, Inc., 1984); *Gene Transfer Vectors for Mammalian Cells*, Miller & Calos, Eds. (Cold Spring Harbor Laboratory, NY, 1987); and *Meth. Enzymol.*, Vols. 154 and 155, Wu & Grossman, and Wu, Eds., respectively.

As such, the definitions of certain terms as used in this specification are provided below. Unless defined otherwise, all technical and scientific terms used herein generally have the same meaning as commonly understood by one of ordinary skill in the art to which this invention belongs.

As used in this specification and the appended claims, the singular forms "a", "an" and "the" include plural referents unless the content clearly dictates otherwise. For example, reference to "a lens" includes a combination of two or more lenses, and the like.

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus from 0.1% to about 10% of the enumerated value.

As used herein, the term "aberrant level," "aberration," and/or "aberrant indication event," or "aberrant indication event," includes any level, amount, concentration, statistical moment, or other quantification of a measurable compartment or material which differs from that of a reference sample of the same class, collection, and/or compartment and/or material, which includes material polymers, copolymer and/or terpolymers and the like.

As used herein, the term "aberrant pattern" includes any spatial patterning, statistical moment, or other spatial quantification of a measurable compartment or material which differs from that of a reference sample of the same class, collection, and/or compartment and/or material, which includes material polymers, copolymer and/or terpolymers and the like. In some embodiments, an aberrant patter may refer to an individual's sight pattern, which may be symptomatic of one or more diseases or conditions of the eye.

As used herein, the "administration" of an agent, drug, contact lens, etc., to a subject includes any route or mechanism of introducing or delivering to a subject such an agent, drug, contact lens, etc., to perform its intended function. Administration of certain indications can be carried out by any suitable route, including orally, intraocularly, intranasally, parenterally (intravenously, intramuscularly, intraperitoneally, or subcutaneously), or topically. Administration includes self-administration and the administration by another.

As used herein, the terms "amphipathic" or "amphiphilic" are meant to refer to any material that is capable of polar and non-polar, or hydrophobic and hydrophilic, interactions. These amphipathic interactions can occur at the same time or in response to an external stimuli at different times. For example, when a specific material or coating is said to be "amphipathic," it is meant that such material or coating can be hydrophobic or hydrophilic depending upon external variables, such as, e.g., temperature, salinity, pH, etc.

The terms "assessing" and "evaluating" are used interchangeably to refer to any form of measurement, and includes determining if an element is present or not. The terms "determining," "measuring," "assessing," and "assaying" are used interchangeably and include both quantitative and qualitative determinations. Assessing may be relative or absolute. "Assessing the presence of" includes determining the amount of something present, as well as determining whether it is present or absent.

As used herein, the term "basis set" or "control base/basis set" refers to a single or collection of parameters, e.g., control points, segments, curves, one or more base curves, one or more dynamic curves, one or more limbal clearance curves, one or more peripheral curves, radius of curvature, chord diameter, sagittal depth, clearance, components, total clearance, fitting characteristics, settings and the like, which are treated as a linearly independent spanning set, visualized as an N-dimensional vector space (N-space), which is differentially disposed in a sample lens, e.g., modified, altered, changed, corrected, etc., as compared to a reference or predicate lens or sample.

As used herein, the term "biocompatible" polymer refers to a synthetic or natural material that is compatible, i.e., non-toxic, to biological systems. A biocompatible polymer may also possess biodegradable properties, although biodegradability is not necessarily a characteristic of a "biocompatible" polymer.

As used herein, the term "biodegradable" polymer refers to a synthetic or natural material that will degrade, i.e., break down, when exposed to, or placed in the presence of an appropriate solvent. The rate of degradation may be fast, e.g., degradation may take place in minutes, or slow, e.g., degradation may take place over hours, days, weeks or months, or the polymer may degrade in response to a particular solvent concentration. In some embodiments, the rate of degradation can be controlled by the type of solvent and/or polymer that is used. A biodegradable polymer may also be biocompatible.

As used herein, the terms or "casting-mold" or "impression" or "imprint" or "molecular imprint", used in the context of contact lens manufacture and/or engineering, refer to any surface or structure created that is capable of reproducing a lens including any ancillary features therewith. Such casting-molds or imprints have various contemplated surfaces, and/or are composed of materials, which include, but are not limited to, polymers, biocompatible polymers, biodegradable polymers, copolymers, terpolymers, hydrogels, and the like.

As used herein, the term "clearance," refers to the thickness of the "tear layer," which is the space between the cornea and the back surface of a scleral lens, and functions as a fluid reservoir to functionally neutralize irregularities of the shape of a cornea. Fitting a scleral contact lens often requires the contact fitter to assess and often adjust the "clearance" of the lens at various points, as more fully described herein.

As used herein, the term "contact lens," generally refers to an amorphous, three-dimensional, polymer matrix that engages part of the eye. Typically, contact lenses are used to achieve a biomedically desired result, e.g., to treat or correct an ophthalmic disease or other condition of the eye. Contact lenses, however, can be used simply to improve one's vision and/or for aesthetic purposes, such as changing the color of one or both eyes. Contact lenses are configured and manufactured in myriad varieties, but the most common are hard and soft contact lenses. Hard contacts typically comprise polymers that are below their glass transition temperature, and contain little or no water, while soft contact lenses are composed of polymers that are above their glass transition temperature, and typically have a relatively high water content. In some embodiments, hard contact lenses have increased permeability when the thickness of the lens is decreased. This is typically performed by doping MMA with TRIS and/or fluorine-based monomers. Soft contact lenses, moreover, possess increased permeability when various alternative materials are used to manipulate the water content by employing manufacturing techniques know to affect the hydration coefficient of hydrogels, which can be made of various materials more fully described herein.

As used herein, the term "control point" or "control points," refers to one or more variables of the subject contact lens selected from the "central vault," "mid-peripheral clearance," "limbal clearance," and the "scleral alignment," each of which are amenable to modification based on adjustments to an attendant "segment parameter." In this respect, when a contact lens fitter wishes to modify an aspect of the "central vault" control point, in addition to adjusting the input parameters of the dynamic curve, segment parameters relating to the total sagittal depth are adjusted. Likewise, when the fitter wishes to modify an aspect of the "mid-peripheral clearance" control point, in addition to adjusting the input parameters of the dynamic curve, segment parameters relating to the "base curve" are adjusted. Should the fitter desire to modify the "limbal clearance" control point, in addition to adjusting the input parameters of the dynamic curve, segment parameters relating to the "limbal clearance curve" are adjusted. Finally, without adjusting the dynamic curve parameters, the "scleral alignment" control point can be modified by adjusting the "peripheral curve alignment" segment parameter, which includes adjusting the toric aspects of the peripheral curve as well, in some embodiments.

As used herein, the terms "correcting," "modifying," "altering," "changing," "treating" or "treatment" or "alleviation" refers to therapeutic, post-therapeutic and/or prophylactic or preventative measures, where the object is to prevent or slow down (lessen) the targeted pathologic condition or disorder. A subject is successfully "treated" for an ophthalmic condition or a lens is appropriately manufactured or generated if, after receiving a therapeutic indication according to the methods described herein, the subject shows observable and/or measurable reduction in or absence of one or more signs and symptoms of an ophthalmic condition. It is also to be appreciated that the various modes of treatment or prevention of medical conditions as described are intended to mean "substantial", which includes total, but also less than total treatment or prevention, and where some biologically or medically relevant result is achieved.

As used herein, the term "control population" refers to an individual or individuals with a negative diagnosis or undetectable condition, i.e., normal or healthy subjects.

As used herein, the term "population" may be any group of at least two individuals. A population may include, e.g., but is not limited to, a control population, a patient population, a reference population, a population group, a family population, a clinical population, and a same sex population.

As used herein, the phrase "difference of the level" refers to differences in the quantity or relative presence of a marker, trait and/or indication present in a sample taken from patients as compared to a control. In some embodiments, a marker, trait and/or indication present at an elevated amount or at a decreased amount in samples from patients is compared relatively to a reference level. In some embodiments, a "difference of a level" may be a statistically significant difference or a relativistic difference in a patient's subjective sight when employing a measurable parameter in or of a predicate lens as compared to a sample lens to be altered or corrected.

As used herein, the term "effectiveness" of an agent, contact lens, medical test indication, and the like, is a quantity sufficient to achieve a desired therapeutic and/or prophylactic effect, and includes for example, an amount which results in the prevention of or a decrease in the symptoms associated with a disease that is being treated, i.e., irregular corneas. The amount, type, kind, modality and/or combinations thereof, of an administered indication to the subject, will depend on the type and severity of the disease or disorder, and on the characteristics of the individual, including, but not limited to, e.g., general health, size and deformation of the ocular indication and/or tolerance to the proffered therapeutic indication. It will also depend on the degree, severity and stage of disease. The skilled artisan will be able to determine the appropriateness of such administrations depending on these and other factors.

As used herein, the terms "effective amount" or "effective correction" refer to a quantity or adjustment sufficient to achieve a desired therapeutic and/or prophylactic effect, e.g., an amount which results in the correction of, prevention of, or a decrease in, the symptoms associated with an ophthalmic condition. The amount, type or method of administered or adjustment, e.g., of one or more parameters of a scleral contact lens, will depend on the type and severity of the disease and on the characteristics of the individual lens or patient, such as general health, size and deformation of the ocular indication and/or tolerance to the proffered therapeutic indication. It will also depend on the degree, severity and type of disease or aberrant refraction, for example. The skilled artisan will be able to determine appropriate modalities depending on these and other factors. The corrective, therapeutic or prophylactic indication prescribed to the patient can also be administered in combination with one or more additional therapeutic indications or modalities. In the methods described herein, a scleral contact lens may be administered to a subject having one or more signs or symptoms of an ophthalmic condition. For example, a "therapeutically prescribed" scleral lens is prescribed and/or manufactured or modified based on a predicate lens insofar as the physiological effects of an ophthalmic condition are, at a minimum, ameliorated.

As used herein, the terms "hydrogel" or "gel" or "hydrogel matrix" are used interchangeably, and encompass polymer and non-polymer based hydrogels, including, e.g., poly (hyaluronic acid), poly(sodium alginate), poly(ethylene glycol), diacrylate, chitosan, and poly(vinyl alcohol)-based hydrogels, for example. "Hydrogel" or "gel" is also meant to refer to all other hydrogel compositions disclosed herein, including hydrogels that contain polymers, copolymers, terpolymer, and complexed polymer hydrogels, i.e., hydrogels that contain one, two, three, four or more monomeric or multimeric constituent units. Also used herein, the terms "matrix" or "hydrogel scaffold" similarly refer to any composition formed into a porous matrix into which it can be modified in three dimensions. Hydrogels are typically continuous networks of hydrophilic polymers that absorb water. In some embodiments, hydrogels constitute all or part, e.g., a hybrid lens, of a soft contact lens.

As used herein, the term "material" or "materials" or "polymers" refers to various substances that constitute or partially constitute a contact lens, which may be a hard, soft, or hybrid contact lens, as more fully detailed herein. In some embodiments, the material is selected from one or more of an oxygen permeable polymer, fluorosilicone acrylate, silicone acrylate, fluorosilicone acrylate with rigid silicone-hydrogel, fluorosilicone acrylate with hydrophilic surface, fluoro-siloxane acrylate, siloxane acrylate, hexafocon A, enflufocon A, enflufocon B, aliphatic fluoroitaconate siloxanyl methacrylate copolymers, hioxifilcon B, hioxifilcon D, hioxifilcon A, polymacon, methafilcon A, 2-hydroxyethyl methacrylate (2-HEMA), 2,3-dihydroxypropyl methacrylate (Glycerol Methacrylate, GMA), polymethyl methacrylate (PMMA), acrylamide, poly(hyaluronic acid), poly(sodium alginate), poly(ethylene glycol) (PEG), poly(lactic acid) polymers, poly(glycolic acid) polymers, poly(lactide-co-glycolides) (PLGA), poly(urethanes), poly(siloxanes) or silicones, poly(ethylene), poly(vinyl pyrrolidone), poly(2-hydroxy ethyl methacrylate), poly(N-vinyl pyrrolidone), poly(methyl methacrylate), poly(vinyl alcohol) (PVA), poly (acrylic acid), poly(vinyl acetate), polyacrylamide, poly (ethylene-co-vinyl acetate), poly(methacrylic acid), polylactic acid (PLA), poly(L-lactide) (PLLA), polyglycolic acids (PGA), polyamides, polyanhydrides, poly(ethylene-co-vinyl alcohol) (EVOH), polycaprolactone, polyvinylhydroxide, poly(ethylene oxide) (PEO), polyorthoesters, poly(N-isopropylacrylamide) (PIPAAm), N,N-dimethylaminopropyl acrylamide (DMAPAAm), poly(N-acryloylpiperidine)-cysteamine (pAP), PIPAAM-carboxymethyl dextran benzylamide sulfonate/sulfate (PIPAAm-CMDBS), N,N-methylene-bis-acrylamide cross-linked polymer, PIPAAm-PEG N-isopropylacrylamide, N,N-dimethylacrylamide, 2-hydroxyethylmethacrylate, N-hydroxyethyl acrylamide, N-vinyl-2-pyrrolidone, 4-pentenoic acid, N-isopropylmeth-acrylamide, N-methoxymethyl-N-isopropylacrylamide, 2-(dimethylmaleimido)-N-ethylacrylamide, N,N-methylene-bis-acrylamide cross-linked polymer, and PIPAAm-PEG, or combinations thereof including polymers, co-polymers and/or terpolymers and combinations thereof.

Likewise, for example, as used herein, the term "polymer" refers to a macromolecule made of repeating monomer or multimer units. Polymers of the present disclosure, include, but are not limited to, poly(hyaluronic acid), poly(sodium alginate), poly(ethylene glycol) (PEG), poly(lactic acid) polymers, poly(glycolic acid) polymers, poly(lactide-co-glycolides) (PLGA), poly(urethanes), poly(siloxanes) or silicones, poly(ethylene), poly(vinyl pyrrolidone), poly(2-hydroxy ethyl methacrylate), poly(N-vinyl pyrrolidone), poly(methyl methacrylate), poly(vinyl alcohol) (PVA), poly (acrylic acid), poly(vinyl acetate), polyacrylamide, poly (ethylene-co-vinyl acetate), poly(methacrylic acid), polylactic acid (PLA), polyglycolic acids (PGA), nylons, polyamides, polyanhydrides, poly(ethylene-co-vinyl alcohol) (EVOH), polycaprolactone, polyvinylhydroxide, poly (ethylene oxide) (PEO), and polyorthoesters or a co-polymer or terpolymer formed from at least two or three members of the groups, respectively.

As used herein, the term "predicate lens," refers to a lens that is employed as a reference lens or control lens from which a modified, altered, changed, and/or corrected lens, and the like, are compared.

As used herein, "prevention" or "preventing" of a disorder or condition refers to an agent, drug, contact lens, etc., that, in a statistical sample, reduces the occurrence of the disorder or condition in the treated sample relative to an untreated control sample, or delays the onset or reduces the severity of one or more symptoms of the disorder or condition relative to the untreated control sample.

As used herein, the term "profile" (used interchangeably with "signature") refers to an individual's ocular characterization with respect to an ophthalmic disease or other condition of the eye.

In some embodiments, a "difference of a signature" may be a statistically separable basis set distribution in a sample as compared to a control. For example, a difference may be separable if the measured integrals of the N-space distributions have overlaps of less than 0.01%, less than 0.05%, less than 0.1%, less than 0.5%, less than 1%, less than 5%, less than 10%, less than 20%, less than 30%, less than 40%, less than 50%, less than 60%, less than 70%, less than 80%, or less than 90%.

As used herein, the term "reference level" refers to an amount, concentration and/or other measurable marker or variable, which may be of interest for comparative purposes. In some embodiments, a reference level may be the level or angle of scleral alignment required to correctly position the scleral contact lens of an individual or patient. In another embodiment, the reference level may be the level or thickness of central vault clearance of a scleral contact lens in the same subject at an earlier time, or at a later time after the clinician or technician has determined that modifications to a predicate lens are required.

As used herein, the term "reference pattern" refers to a spatial or temporal component or basis set from a reference sample, which may be of interest for comparative purposes. In some embodiments, a reference pattern may be the spatial distribution of one or more sagittal depth curve parameters of a scleral lens ascertained taken from a lens, e.g., predicate lens, at a particular time in a particular vector orientation. In another embodiment, the reference level may be the spatial distribution of a curve vector or parameter from a lens prior to or after modifications have been made to the indicated variable curve, e.g., the sagittal depth of the dynamic curve.

As used herein, the term "sample" may include, but is not limited to, a sample material serving as a contact lens substrate, a sample polymer as further defined herein, a bodily tissue or a bodily fluid including, but not limited to, e.g., blood (or a fraction of blood including, but not limited to, e.g., plasma or serum), lymph, mucus, tears, saliva, cystic fluid, CSF, ascites fluid, or whole blood, and including biopsy samples of body tissue. A sample may be obtained from any subject, e.g., a subject/patient having or suspected to be at risk for an ophthalmic condition, as well as from control subjects, and further where a sample material may be obtained from a contact lens, soft contact lens, gas permeable contact lens, scleral contact lens, predicate lens, and the like.

As used herein, the terms "scleral lens" or "scleral contact lens," refers to large-diameter (typically, relatively larger than a soft contact lens) gas permeable, contact lenses specially designed to vault over the entire corneal surface and rest on the "white" of the eye (sclera). In some embodiments, scleral lenses functionally replace irregular corneas with a smooth optical surface to correct vision problems caused by, e.g., keratoconus and other corneal irregularities. The space between the cornea and the back surface of a scleral lens, moreover, functions as a fluid reservoir, which acts like a "tear lens" and functionally neutralizes the irregularity of the corneas shape, providing improved vision that would otherwise not be achievable with other ophthalmic lenses. FIG. 1A illustrates a scleral gas permeable (GP) lens fit on an irregularly shaped, keratoconic cornea, but scleral lenses made by the methods of this invention may be made of other materials and may be fit on non-keratoconic corneas.

As used herein, the term "screening" means determining whether a test lens has the capabilities or characteristics of preventing or slowing down (lessening) the targeted pathologic condition stated herein, namely one or more ophthalmic diseases or conditions of the eye. Diagnostic methods may differ in their sensitivity inasmuch as the sensitivity of a diagnostic assay is the percentage of diseased individuals who elicit a favorable response to a test lens or treatment.

As used herein, the term "segments," or "segment parameters" refer to the "base curve" or "base curvature" of a lens, the "dynamic curve" or "dynamic curve clearance" of a lens, the "limbal clearance" or "limbal clearance curve" of a lens, and the scleral alignment," each of which are amenable to modification for adjusting associated control points of the subject contact lens selected from the "central vault," "mid-peripheral clearance," "limbal clearance," and the "scleral alignment," each of which are amenable to modification based on adjustments to an attendant "segment parameter." In this respect, when a contact lens fitter wishes to modify an aspect of the "central vault" control point, in addition to adjusting the input parameters of the dynamic curve, segment parameters relating to the total sagittal depth are adjusted. Likewise, when the fitter wishes to modify an aspect of the "mid-peripheral clearance" control point, in addition to adjusting the input parameters of the dynamic curve, segment parameters relating to the "base curve" are adjusted. Should the fitter desire to modify the "limbal clearance" control point, in addition to adjusting the input parameters of the dynamic curve, segment parameters relating to the "limbal clearance curve" are adjusted. Finally, without adjusting the dynamic curve parameters, the "scleral alignment" control point can be modified by adjusting the "peripheral curve alignment" segment parameter, which includes adjusting the toric aspects of the peripheral curve as well, in some embodiments.

In accord, each segment parameter as defined above possesses one or more component selected from "radius of curvature," "chord diameter," "sagittal depth" or "sagittal clearance," and a "total depth" or "total clearance," each of which function as constituents of the various segment parameters that are modified or adjusted in certain circumstances depending on the desired result to be achieved. The foregoing aspects of the present disclosure will become more apparent as read in context of the specification as a whole.

As used herein, the term "subject" refers to a mammal, including, but not limited to, e.g., a human, but can also be an animal, e.g., domestic animals (e.g., dogs, cats and the like), farm animals (e.g., cows, sheep, pigs, horses and the like) and laboratory animals (e.g., monkey, rats, mice, rabbits, guinea pigs and the like). The term "patient" refers to a "subject" who is, or is suspected to be, afflicted with one or more ophthalmic diseases or conditions of the eye.

As used herein, the term "substantially pure" or "substantially homogenous" means an object species or material, e.g., a polymer, is the predominant species or polymer present (i.e., on a molar basis it is more abundant than any other individual species in the composition). Generally, a substantially pure composition will be more than about 80%, more than about 90%, more than about 95%, more than about 97%, more than about 98%, more than about 99%, or more than about 99.5% of all species present in the composition. Typically, the object species or material is purified to essential homogeneity (contaminant species or materials cannot be detected in the composition by conventional detection methods) when the composition consists essentially of a single species or polymer.

As used herein, the term "wettability" or "wetting" refers to the ability of a substance to maintain surface contact with a different substance or surface. Surface contact results from intermolecular interactions between a substance and the contacted surface. Wetting, and the surface forces that control wetting, are also responsible for other related effects, including capillary action or capillary effects. For example, when a contact lens engages a surface of the eye, e.g., the sclera when referring to a scleral contact lens, the wettability, or degree of wetting, can be calculated in terms of the force balance between the adhesive and cohesive forces. Wettability can be altered by, for example, changing the angle of curvature for a particular parameter, which, thereby, may affect the adhesive and cohesive forces between the contact lens and the eye.

Overview

The present disclosure generally describes methods, systems and products relating to the development and manufacture of scleral contact lenses. A number of dimensions for the scleral lenses are generated based on control points and attendant curvature parameters. Any intended change to one or more of the curve parameters imparts an improved anterior and posterior surface of the scleral lens and associated thickness, while undesired modifications to control points and other curve parameters remain static inasmuch as the sagittal depth component is an input parameter of the present disclosure that can be adjusted based on the information emanating from other control points and/or segment parameters pursuant to the formulas, calculations and algorithms described herein.

Fitting a scleral contact lens requires the contact fitter to assess and often adjust the clearance of the lens at various points (the thickness of the tear layer), in illustrative embodiments. The present technology allows the contact lens fitter to make adjustments in lens clearance various, e.g., at one, two, three, four, five or more, distinct points by changing a single parameter per point. Changes to any parameter affect the lens clearance at the desired point only, and do not change the lens clearance at the other undesired control points (unless these points are in fact desired control points at the outset). This feature is unparalleled in the art and is borne out of, in part, the metric parameters that are supplied at the outset of the methods and systems provided herein. The fitter can also change the alignment of the peripheral curves to the scleral lens without affecting the clearance of lens at any of the previous points.

In some embodiments, such input parameters are the segment parameters relating to one or more of the base curve or base curvature of a lens, the dynamic curve or dynamic curve clearances of a lens, the limbal clearance or limbal clearance curve of a lens, and the scleral alignment, each of which are amenable to modification for adjusting associated control points of the subject contact lens selected from the central vault, mid-peripheral clearance, limbal clearance, and the scleral alignment, each of which are amenable to modification based on adjustments to an attendant segment parameter. In this respect, when a contact lens fitter wishes to modify an aspect of the central vault control point, in addition to adjusting the input parameters of the dynamic curve, segment parameters relating to the total sagittal depth are adjusted. Likewise, when the fitter wishes to modify an aspect of the mid-peripheral clearance control point, in addition to adjusting the input parameters of the dynamic curve, segment parameters relating to the base curve are adjusted. Should the fitter desire to modify the limbal clearance control point, in addition to adjusting the input parameters of the dynamic curve, segment parameters relating to the limbal clearance curve are adjusted. Finally, without adjusting the dynamic curve parameters, the scleral alignment control point can be modified by adjusting the peripheral curve alignment segment parameter, which includes adjusting the toric aspects of the peripheral curve as well, in some embodiments. In accord, each segment parameter as defined above possesses one or more component selected from radius of curvature, chord diameter, sagittal depth or sagittal clearance, and a total depth or total clearance, each of which function as constituents of the various segment parameters that are modified depending on the desired result to be achieved. See charts A and B below.

Figure 1B:
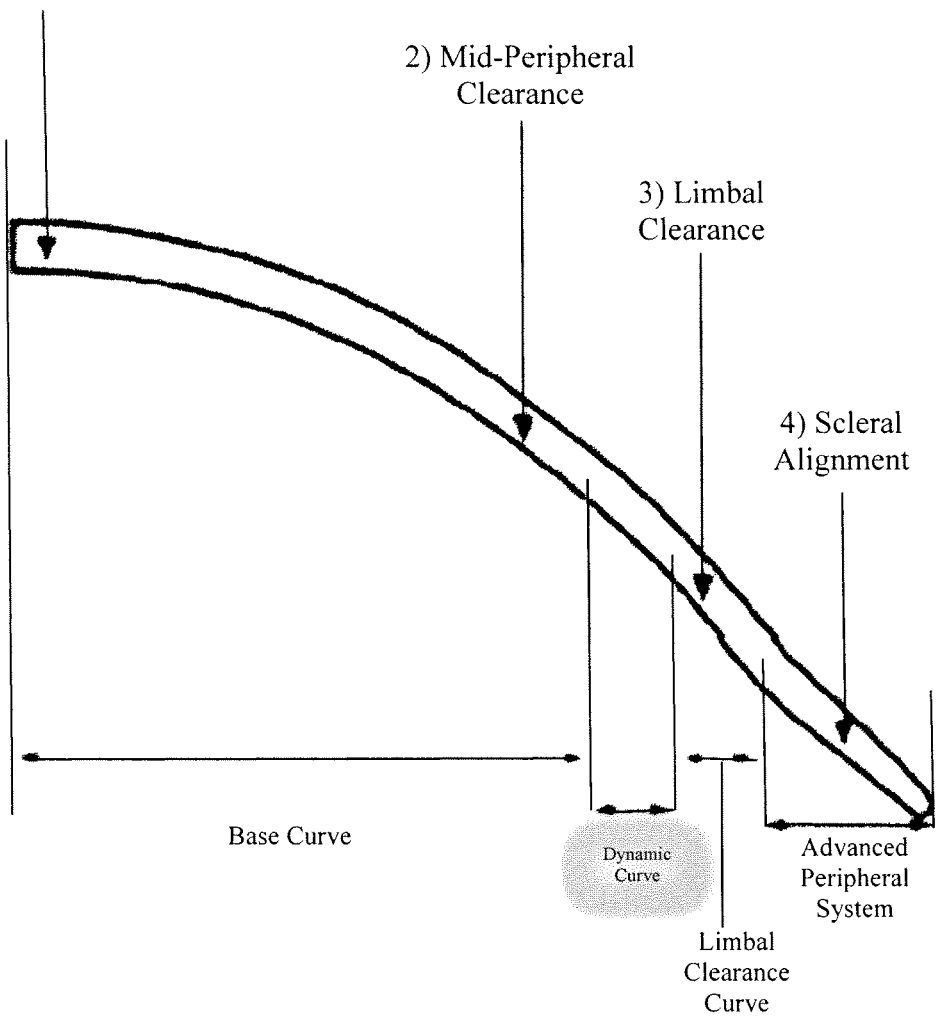

In some embodiments, the input parameters are the segment parameters relating to one or more of the dynamic curve and/or sagittal depth or sagittal clearance, and a total depth or total clearance, each of which function as constituents of the various segment parameters that are modified or adjusted in certain circumstances depending on the desired result to be achieved. In illustrative embodiments, the input parameter that affects the lens clearance at the desired point only, and does not change the lens clearance at other undesired control points is the dynamic curve segment parameter. The fitter can also change the alignment of the peripheral curves to the scleral lens without affecting the clearance of lens at other points. In this respect, it is important to first appreciate the various components, parameters, curves and variables of the present technology in their basic form, with reference to FIG. 1 and the following Table 1. FIG. 1B illustrates the control points, and the four components to a successful scleral lens fit include:
 proper central vault—adjust lens Sag;
 proper mid-peripheral curve—adjust base curve;
 proper limbal clearance—adjust limbal clearance curve;
 proper scleral alignment—adjust peripheral curve, including possible toric peripheral curve,
which is peripheral to the vault zone and is where the lens lands on the patient's sclera conjunctiva.

TABLE 1

| | | | | | | |
|---|---|---|---|---|---|---|
| SB/RB is the Dynamic Curve (always calculated, all other curves are specified) | | | | | | |
| Control Points | Segment (parameter affecting control pt) | Radius of Curvature | Chord Diameter | Sagittal Depth Component | | Central Vault Modified Variables to Achieve SC Sagittal Component (recalc. RB1) |
| MP Clearance | Base Curve | RA | DA | SA | ST | SA - static; ST - variable |
| Central vault | Dynamic Curve | RB | DB | SB | (clearance) | SB1 = ST1 − SA − SC |
| Limbal Clearance | Limbal Clearance Curve | RC | DC | SC | | SC - static |
| Scleral Alignment (angle) | Peripheral Curve | RD | DD | SD (non-clearance) | | SD - static |
| SB/RB is the Smart Curve (always calculated, all other curves are specified) | | | | | | |
| Control Points | Segment (parameter affecting control pt) | Radius of Curvature | Chord Diameter | Sagittal Depth Component | | Mid-Peripheral Clearance Modified Variables to Achieve SC Sagittal Component (recalc. RB2) |
| MP Clearance | Base Curve | RA | DA | SA | ST | SA - variable; ST - static |
| Central vault | Dynamic Curve | RB | DB | SB | (clearance) | SB2 = ST − SA2 − SC |
| Limbal Clearance | Limbal Clearance Curve | RC | DC | SC | | SC - static |
| Scleral Alignment (angle) | Peripheral Curve | RD | DD | SD (non-clearance) | | SD - static |
| SB/RB is the Smart Curve (always calculated, all other curves are specified) | | | | | | |
| Control Points | Segment (parameter affecting control pt) | Radius of Curvature | Chord Diameter | Sagittal Depth Component | | Limbal Clearance Modified Variables to Achieve SC Sagittal Component (recalc. RB3) |
| MP Clearance | Base Curve | RA | DA | SA | ST | ST & SA - static |
| Central vault | Dynamic Curve | RB | DB | SB | (clearance) | SB3 = ST − SA − SC3 |
| Limbal Clearance | Limbal Clearance Curve | RC | DC | SC | | SC - variable |
| Scleral Alignment (angle) | Peripheral Curve | RD | DD | SD (non-clearance) | | SD - static |
| SB/RB is the Smart Curve (no adjustments to Smart Curve Necessary) | | | | | | |
| Control Points | Segment (parameter affecting control pt) | Radius of Curvature | Chord Diameter | Sagittal Depth Component | | Peripheral Curve Alignment Modified Variables to Achieve SC Sagittal Component (recalc. RB) |
| MP Clearance | Base Curve | RA | DA | SA | ST | SA - static |
| Central vault | Dynamic Curve | RB | DB | SB | (clearance) | SB - static |
| Limbal Clearance | Limbal Clearance Curve | RC | DC | SC | | SC - static |
| Scleral Alignment (angle) | Peripheral Curve | RD | DD | SD (non-clearance) | | SD - variable |

Figure 8:
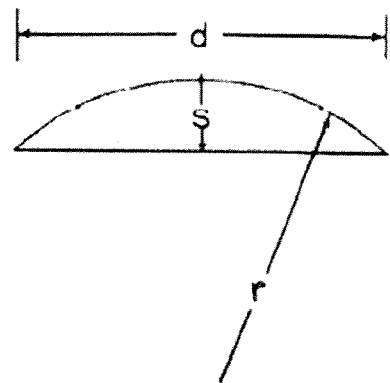
FIG. 8 illustrates the relation of sagittal depth; radius of curvature; and chord or optical diameter.

Sagittal Depth Table—The sagittal depth, or vertex depth as it is often referred to in the field of optics, relates the central point on the chord of a spherical arc to a central point on the spherical arc. This relationship is illustrated in FIG. 8, where s is the sagittal depth; r is the radius of curvature; and d is the chord or optical diameter.

It is possible to determine the sagital depth mathematically when the radius of curvature of the arc and the chord value are known. The formula for this relationship is:

$$s = r - \sqrt{r^2 - (d/2)^2}$$

Using the formula, the sagittal depth of the base curve of a contact lens will be computed when the base curve equals 7.50 mm and the optical zone equals 7.8 mm. Substituting:

$$s = 7.50 - \sqrt{7.50^2 - 3.90^2}$$

$$= 7.50 - \sqrt{56.250 - 15.210}$$

$$= 7.50 - \sqrt{41.040}$$

$$= 7.50 - 6.406$$

$$= 1.094 \text{ mm}$$

Figure 9:
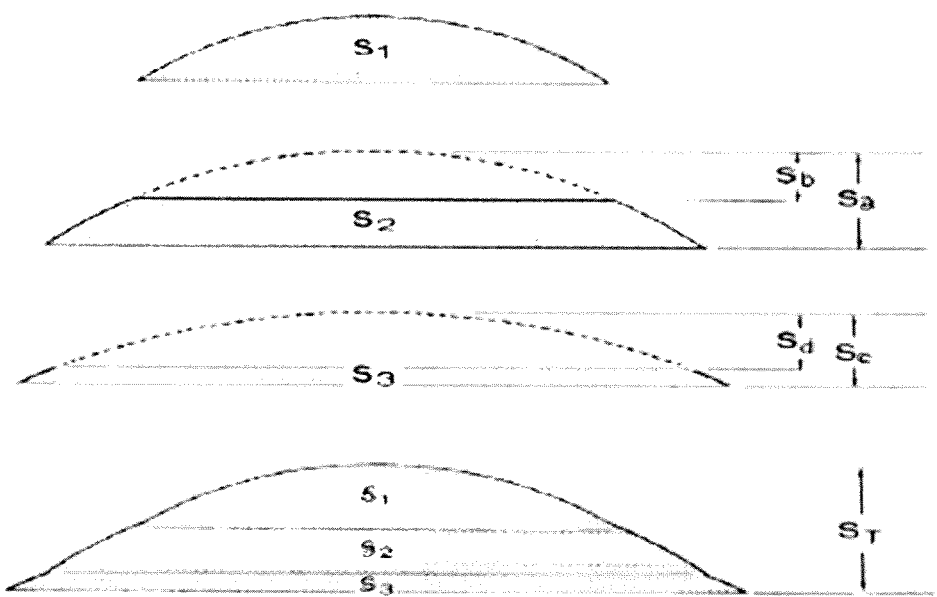
FIGS. 9 and 10 illustrate back surface sagittal depth for lenses having multiple surfaces with different radius of curvature.
Figure 10:
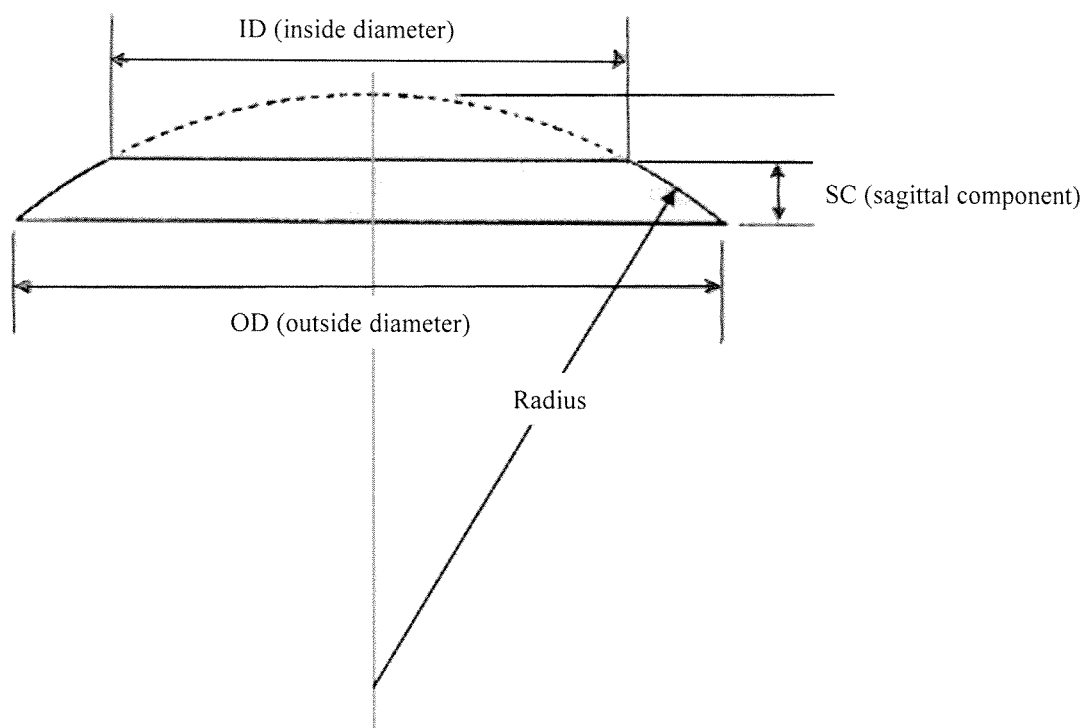

The Back Surface Sagittal Depth—Because the back surface or ocular surface of a contact lens contains more than one spherical surface, it is necessary to treat each radius of curvature separately, as illustrated in FIGS. 9 and 10. That is:

1. The base curve will yield a sagittal component ($s_1$).
2. The second radius will yield another sagittal component ($s_2$).
3. The third curve, or bevel, will yield another sagittal component($s_3$).

4. The total sagittal value of the back surface is obtained by adding the sagittal component ($s_t$).

The Base Curve Component ($s_1$)—The sagittal value for the base curve of the contact lens is, found directly by referring to Table 1 of Sagittal Depths shown above. It is the only sagittal component, on the ocular surface of the lens, that can be obtained directly. This will become evident as follows.

The Second Radius Component ($s_2$)—The second radius surface, when viewed in cross-section, does not represent a continuous spherical arc with respect to the optic axis of the contact lens. Unlike the base curve, the second radius arc is segmented, with symmetrical portions on either side of the optical axis. The inner limits of the segments of the second radius arc are at the optical zone junction; and the outer limits of the segments are at the third radius (or bevel) junction. The sagittal depth component which the second radius arc contributes to the total sagittal depth of the back surface will be the vertical depth as measured between the inner and outer limits. The exact measurement will be the difference limits of the arc ($s_b$). That is:

$$S_2 = S_a - S_b.$$

The Third Radius Component ($s_3$)—The third radius, like the second radius, represents a segmented spherical arc on the back surface of the contact lens when viewed in cross-section. Therefore, the inner limits and the outer limits of the arc must be considered to determine its sagittal depth component. Let $s_c$ represent the sagittal depth for the outer limits, and let $s_d$ represent the sagittal depth for the inner limits of the third radius arc. The difference between these sagittal depth values is the sagittal depth component that the third radius contributes to the total sagittal depth of the contact lens back surface. It is given by:

$$S_3 = S_c - S_d.$$

The Sagittal Depth Total of the Back Surface (st)—In the case of a tri-curve contact lens, such as treated above, three separate sagittal depth components contribute to the sagittal depth total of the back surface. It is determined by the summation of the components according to the Lenticular Radius Formula:

$$S_t = S_1 + S_2 + S_3.$$

Thus, if the following variables are known, sagittal component (Sag); inside diameter (ID) and the outside diameter (OD), then it is possible to solve for the radius.

| Solve for Radius | | | |
|---|---|---|---|
| ID | 10.000 | RAD | 12.311 = SQRT((ID/2)^2 + (((OD/2)^2 − (ID/2)^2 + Sag^2)/(2 * Sag)))^2) |
| OD | 12.000 | | |
| Sag | 0.500 | | |

In some embodiments, scleral contacts are large-diameter gas permeable contact lenses specially designed to vault over the entire corneal surface and rest on the "white" of the eye (sclera). In doing so, scleral lenses functionally replace the irregular cornea with a perfectly smooth optical surface to correct vision problems caused by keratoconus and other corneal irregularities. The space between the cornea and the back surface of a scleral lens acts as a fluid reservoir, this reservoir acts like a "tear lens" and functionally neutralizes the irregularity of the corneas shape, providing improved vision that would otherwise not be achievable with other ophthalmic lenses.

Figure 2A:
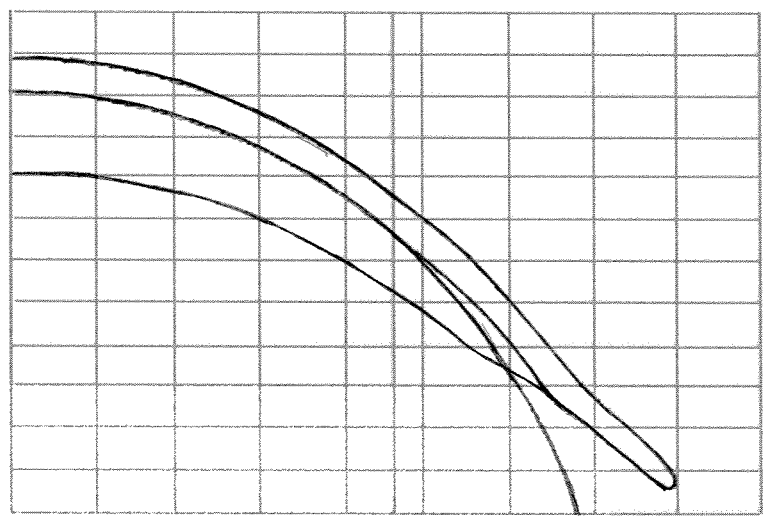
FIGS. 2A and 2B depict the cross-section and back surface of a scleral contact lens in graphic form.
Figure 2B:
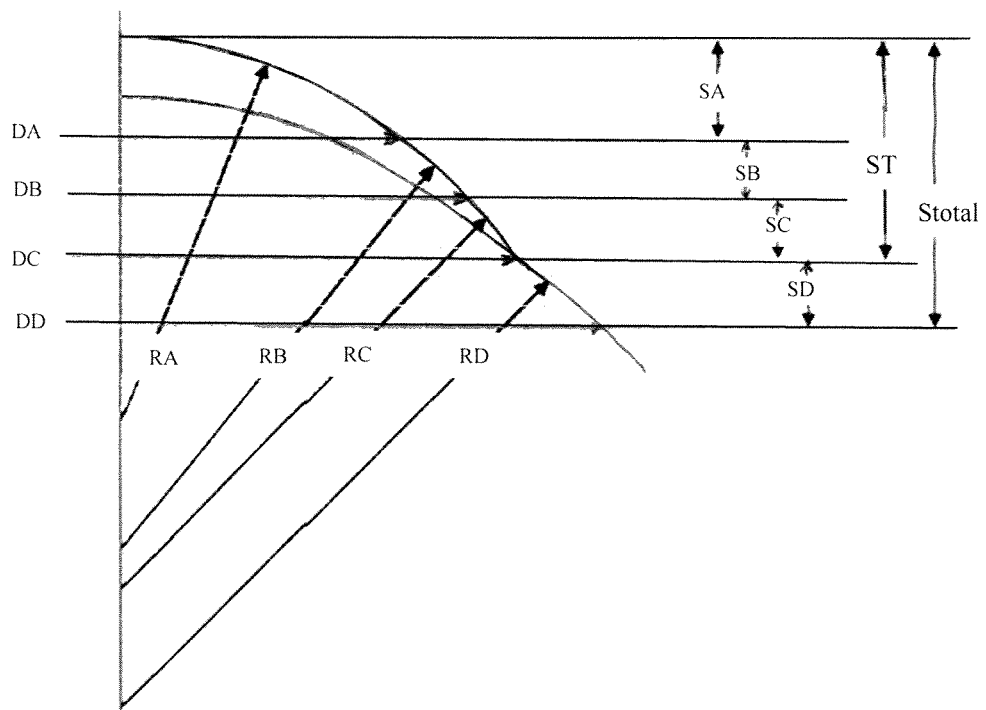

Fitting a scleral contact lens is an intricate process requiring the contact fitter to assess and often adjust the clearance of the lens at various points (the thickness of the tear layer). The present invention's technology allows the contact lens fitter to make adjustments in lens clearance at three distinct points by changing a single parameter per point. Changes to any parameter affect the lens clearance at the desired point only, and do no change the lens clearance at the other control points. The fitter can also change the alignment of the peripheral curves to the sclera without affecting the clearance of lens at any of the previous points. See FIGS. 1-2.

As such, in illustrative embodiments, the initial designing of a contact lens of the present invention includes the parameter "$S_{TOTAL}$" as used herein, which refers to the total Sag of the entire lens. In some embodiments, the description and examples impart the method and manufacture of a design for a complete lens with a dynamic curve indications. In suitable embodiments, the present methods account for peripheral curve sagittal component vectors. Likewise, adjustments to the central clearance, mid-peripheral clearance, and limbal clearance are provided for in illustrative embodiments. Along the same lines, one aspect of the present invention entails a method for designing a lens with dynamic curve as detailed above and more fully explicated in view of the Examples below. As such, the present technology relates to both methods for ad hoc contact lens design and manufacture in concert with perfecting the control points and parameters of such a contacts lens by adjusting clearance values with respect to referenced predicate lens.

In some embodiments, a scleral contact lens with four sagittal components is provided. Each segment has a Radius, a Chord Diameter, and Sagittal Depth component. As defined in illustrative embodiments, "$S_{TOTAL}$" is the sagittal depth total of the entire lens, where "ST" is the sagittal depth total of the first three sagittal components. When making adjustments to lens clearance in certain embodiments, "SD" is not taken in to account in some embodiments as the lens makes contact with the sclera at "DC." In some embodiments, "SD" is only used to adjust the lenses peripheral curves to the angle of the sclera. "RD" is only adjusted to alter the alignment of the peripheral curves to the angle of the sclera. "SB/RB" is the Dynamic curve, i.e., it is always calculated in some embodiments, where all other curves are specified, in illustrative embodiments. As such, it's made clear in these embodiments that SD is not used when making adjustments to a predicate lens. Just as importantly, however, SD is used when designing a lens not based on a predicate lens. See the Table below and Examples, and also FIGS. 1-2.

| Segment | Radius of Curvature | Chord Diameter | Sagittal Component |
|---|---|---|---|
| Base Curve | RA | DA | SA |
| Dynamic Curve | RB | DB | SB |
| Limbal Clearance Curve | RC | DC | SC |
| Peripheral Curves(s) | RD | DD | SD |

Considerations for Designing Contact Lenses

Several things must be considered when designing contact lenses, but perhaps the most important is biocompatibility. While several factors can affect a lenses biocompatibility, perhaps the most important is the wettability of the lens. Contact lenses are constantly in contact with the fluid of the eye. When the contact is placed in the eye, a layer of tear separated it from the eye. This is commonly known as the tear film. The human tear consists not only of water, but also of protein, lipids, sodium, calcium, bicarbonate, and enzymes. If a polymer is hydrophobic it will repel the water that makes up a majority of the tear surface. This disrupts the tear flow, and results in the deposition of an albumin film on the lens. This reduces the effectiveness of the contact, and can cause infection and/or irritation. This is due to the contact lens hindering the tear film that covers the eye. Therefore, if a contact lens surface is highly hydrophobic it must treated to be made hydrophilic. Doping the polymer or treating the surface of the polymer can do this change in the morphology of the surface.

Wettability is not the only reason for deposits on contact lenses. Most contact lenses consist of monomers and cross-link materials that have charges on the monomers. This charge distribution results in the attraction of proteins. This is because proteins also have charge distributions, and they attract one another. Protein or lipid depositions create a biofilm in the lens. This can result in the lens losing its ocular properties, and the turns turning a yellow color. The yellow color is a result of lens spoilage, a result of the diffusion of proteins and lipid into the lens. The push for extended wear lenses is limited by the lenses biocompatibility. For extended wear, the contact lens must be highly hydrophilic and must resist the deposition of a biofilm on the lens. While the surface must resist the formation of a biofilm it must also be semi-permeable. The human eye does not receive adequate blood flow to supply the eye with enough oxygen, or to remove enough carbon dioxide. The eye relies on its exposure to the air for aid. If the contact lens does not provide adequate permeability, the eye suffers serious health effects. This permeability, DK, is typically measured in units of Barrers ($10^{-10}$ $cm^3$ $O_2$ (STP) $cm/cm^2$s cmHg). Where D is the diffusion coefficient, and K is the solubility coefficient. For a contact lens to be acceptable for extended wear they must have a DK of 100 Barrers. The actual amount of oxygen reaching the cornea is called the oxygen transmissibility. This is in terms of DK/L, where L is the thickness of the lens. It can be seem that the amount of oxygen reaching the eye is inversely proportional to the lens thickness, L.

While the polymer that makes up the lens is important it is also important, for it to be produced in a way so that there is no contamination to the eye. This means not only that that polymer itself is capable of being in contact with the eye, but also that it can be produced in a way so that any residual monomer or solution does not pose a health risk. It is important to test the monomers for biocompatibility, and to assure that the monomers used in the lens are highly pure. In addition to the biochemistry of the lens, it must also be physically acceptable. A big requirement of the lens is that it must be lightweight. This allows it to be placed on the eye comfortably for extended periods of time without causing ocular strain. This is difficult because the lens must also be strong to avoid tearing and/or scratching, a reasonably high modulus of elasticity for ease of handling, and yet still soft and flexible enough to feel comfortable on the eye.

The size and specific gravity of the lens also become important factors for eye comfort. If the lens is too thick it will interfere with the eyelid and cause discomfort. If the specific weight of the lens is significantly different from that of tears the lens will have a tendency to move up or down. This makes the lens unstable on the cornea, and makes fitting problematic. Finally a good contact lens must be affordable. It has to be able to be made cheaply and efficiently so that it can be purchased at a reasonable cost.

The biocompatibility of contact lenses, moreover, is at the forefront of scientific and engineering research. This is in partly due to the push for an extended wear lens, and also due to health disorders that arise from contact lens use. While many advances have been made in the biocompatibility, and physical properties of lenses, significant problems still exist. Possible contact lens disorders are listed in table. These disorders must be taken into account when comparing contact lenses to eye glasses or laser correction surgery. While taking out and removing contacts on a daily or weekly basis can be stressful, the eye can typically heal from contact lens disorders. This should be compared to laser surgery where a mistake can be fatally hazardous to the eye. The debate between contacts and laser surgery will increase in the future as laser surgery becomes more successful and contact lens manufacturers develop cheaper, 30 day extended wear lenses that have little risk of infection.

As such, all contact lenses consist of amorphous, three-dimensional, polymer matrixes. Hard contacts consist of polymers that are below their glass transition temperature, and typically contain little or no water. Soft contact lenses consist of polymers that are above their glass transition temperature, and typically have a relatively high water content. The thickness of the lens can also impact the foregoing considerations.

The thickness of a scleral contact lens, tear layer, distance between defined loci or vertices, points, apical arcs, etc., ("thickness variable") in one or more of the segment parameters or curves is determined and modified when necessary, in some embodiments. In this regard, in suitable embodiments, the thickness of the thickness variable is from about 0.1, 0.25, 0.5, 0.75, 1, 3, 5, 7, 9, 10, 15, 20, 30, 50, 100, 500, or 900 nm, mm and/or cm to from about 0.1, 0.25, 0.5, 0.75, 1, 3, 5, 7, 9, 10, 15, 20, 30, 50, 100, 500, or 900 nm, mm and/or cm. In another embodiment the thickness of the thickness variable is from about 0.1, 0.25, 0.5, 0.75, 1, 3, 5, 7, 9, or 10 nm, µm, mm and/or cm to from about 0.5, 0.75, 1, 3, 5, 7, 9, 10, 15, 20, 30, 50, or 100 nm, µm, mm and/or cm.

General Contact Lens Material Classifications

Soft Lenses: In some embodiments, the general contact lens material classification for soft lenses comprises: hydroxyethylmethacrylate (HEMA) based polymers (e.g., methafilconA); glycerol methacrylate (GMA) based polymers-HEMA replaced by glycerol methacrylate (e.g., hioxifilcon A); and silicone based polymers-materials containing siloxane (e.g., comfilcon A), and/or combinations thereof.

Gas Permeable (RGP) Materials: In some embodiments, the general contact lens material classification for RGP lenses comprises materials based on methyl methacrylate (MMA; note: pure MMA is polymerized to PMMA and was the first RGP material); MMA materials with silicone acrylate added (e.g., itafocon B); and (II) MMA materials with fluorosilicone acrylate based materials (e.g., hexafocon A), and/or combinations thereof.

Hard Contact lenses have increased their permeability by thinning the lens, and doping MMA with TRIS and/or fluorine based monomers. Soft contact lenses have sought to increase their permeability in different ways. Hydrogel lenses has sought to increase water content, while siloxane hydrogels have tried to find ways of decreasing their water content.

Contact lens science has increased rapidly in the 20th century. While significant progress has been made, the most challenging aspect await to be solved in the 21st century. As we begin the new millennium polymer scientist are working in collaboration with biologist, chemist, and medical doctors to produce the extended wear lens. This lens will be able to be used for up to thirty days without removal, and be almost completely resistive to biofilm deposition. See *Contact Lens Polymers: A technical overview of the development, manufacturing, and future of contact lenses*. Justin Bergin, CE435, *Introduction to Polymers, Dept. of Chemical Engineering State University of New York at Buffalo*, Apr. 6, 2000.

The polymer may also be biodegradable, biocompatible polymer matrix. In some embodiments, the polymer matrix is a substrate lens material that maintains integrity while adjustments are performed. Polymer formulations can lead to prolonged duration of therapeutic effect. (See Reddy, *Ann. Pharmacother.*, 34 (7-8):915-923 (2000)). A polymer formulation for human growth hormone (hGH) has been used in clinical trials. (See Kozarich and Rich, *Chemical Biology*, 2:548-552 (1998)).

The polymer components, in illustrative embodiments, includes but is not limited to various substances that constitute or partially constitute a contact lens, which may be a hard, soft, or hybrid contact lens, as more fully detailed herein. In some embodiments, the material is selected from one or more of an oxygen permeable polymer, fluorosilicone acrylate, silicone acrylate, fluorosilicone acrylate with rigid silicone-hydrogel, fluorosilicone acrylate with hydrophilic surface, fluoro-siloxane acrylate, siloxane acrylate, hexafocon A, enflufocon A, enflufocon B, aliphatic fluoroitaconate siloxanyl methacrylate copolymers, hioxifilcon B, hioxifilcon D, hioxifilcon A, polymacon, methafilcon A, 2-hydroxyethyl methacrylate (2-HEMA), 2,3-dihydroxypropyl methacrylate (Glycerol Methacrylate, GMA), polymethyl methacrylate (PMMA), acrylamide, poly(hyaluronic acid), poly(sodium alginate), poly(ethylene glycol) (PEG), poly(lactic acid) polymers, poly(glycolic acid) polymers, poly(lactide-co-glycolides) (PLGA), poly(urethanes), poly(siloxanes) or silicones, poly(ethylene), poly(vinyl pyrrolidone), poly(-hydroxy ethyl methacrylate), poly(N-vinyl pyrrolidone), poly(methyl methacrylate), poly(vinyl alcohol) (PVA), poly(acrylic acid), poly(vinyl acetate), polyacrylamide, poly(ethylene-co-vinyl acetate), poly(methacrylic acid), polylactic acid (PLA), poly(L-lactide) (PLLA), polyglycolic acids (PGA), polyamides, polyanhydrides, poly(ethylene-co-vinyl alcohol) (EVOH), polycaprolactone, polyvinylhydroxide, poly(ethylene oxide) (PEO), polyorthoesters, poly(N-isopropylacrylamide) (PIPAAm), N,N-dimethylaminopropyl acrylamide (DMAPAAm), poly(N-acryloylpiperidine)-cysteamine (pAP), PIPAAM-carboxymethyl dextran benzylamide sulfonate/sulfate (PIPAAm-CMDBS), N,N-methylene-bis-acrylamide crosslinked polymer, PIPAAm-PEG N-isopropylacrylamide, N,N-dimethylacrylamide, 2-hydroxyethylmethacrylate, N-hydroxyethyl acrylamide, N-vinyl-2-pyrrolidone, 4-pentenoic acid, N-isopropylmeth-acrylamide, N-methoxymethyl-N-isopropylacrylamide, 2-(dimethylmaleimido)-N-ethylacrylamide, N,N-methylene-bis-acrylamide crosslinked polymer, and PIPAAm-PEG, or combinations thereof including polymers, co-polymers and/or terpolymers and combinations thereof.

Likewise, for example, polymers of the present disclosure, include, but are not limited to, poly(hyaluronic acid), poly(sodium alginate), poly(ethylene glycol) (PEG), poly(lactic acid) polymers, poly(glycolic acid) polymers, poly(lactide-co-glycolides) (PLGA), poly(urethanes), poly(siloxanes) or silicones, poly(ethylene), poly(vinyl pyrrolidone), poly(2-hydroxy ethyl methacrylate), poly(N-vinyl pyrrolidone), poly(methyl methacrylate), poly(vinyl alcohol) (PVA), poly(acrylic acid), poly(vinyl acetate), polyacrylamide, poly(ethylene-co-vinyl acetate), poly(methacrylic acid), polylactic acid (PLA), polyglycolic acids (PGA), nylons, polyamides, polyanhydrides, poly(ethylene-co-vinyl alcohol) (EVOH), polycaprolactone, polyvinylhydroxide, poly(ethylene oxide) (PEO), and polyorthoesters or a co-polymer or terpolymer formed from at least two or three members of the groups, respectively.

Scleral Contact Lens Indications

In many respects, it is important to first appreciate why people wear contact lenses. Contact lenses can be worn for multiple reasons. The majority of contact lens users wear them for vision to correct myopia, and some research has shown that contacts slow of the progression of myopia. In addition, contact lenses can also be worn to change the color of the eye for aesthetic reasons. The information in table one lists only a few of the conditions that favor contact lens use.

| Typical Reasons For Contact Lens Use | |
|---|---|
| Anisometropia | Large difference in correction needed for each eye |
| | Glasses cause loss of binocular vision |
| Aphakia | Lack of natural lens |
| | Glasses are poor at correcting |
| | Glasses cannot correct one eye aphakia |
| Keratoconus | Irregular cornea, glasses cannot fix |
| | Contact and tear film can help correct |
| Irregular Astigmatism | Irregular or distorted cornea |
| | Glasses cannot fix |
| | Hard contact lenses with tear film can ease irregularity |
| Corneal Scarring | Correction with hard contacts must be tried before transplant |
| | Injury can be concealed aesthetically |
| Trichiasis | Injury to cornea due to ingrown eyelash |
| | Contact lenses can protect cornea |
| Cosmetic | Can change eye color for fashion |
| Occupational | Used to correct vision when glasses are unacceptable |
| | Example: fighter pilots, sports. |

Many disease indications impart the need for a scleral contact lens. In illustrative embodiments, the contact lens is therapeutic for ophthalmic indications selected from the group consisting of irregular corneas, improving normal cornea function, improving vision, reducing pain, reducing light sensitivity, disorders or injuries to the eye, dry eye, kerotanconjuctivis sicca, microphthalmia, ocular pemphigoid, keratoconus, corneal ectasia, Stevens-Johnson syndrome, Sjögren's syndrome, aniridia, neurotrophic keratitis, autoimmune diseases, chronic graft-versus-host disease, post-LASIK dry eye, irregular astigmatism, complications post-LASIK surgery, higher order eye aberrations, complications post-corneal transplant, pellucid degeneration, surgical complications, distorted corneal implants, corneal grafts and chemical or burn injuries, and combinations thereof.

In this respect, for example, an irregular cornea is a common indication for a scleral contact lens. The cornea is the clear tissue in front of the iris, or colored part of the eye. Normally, it has a smooth arc shape that allows light to focus in the same spot in the back of the eye to give clear vision. An uneven cornea develops bumps and dips in the surface. Light rays get bent in different directions with each change in the shape. Since the light rays focus in different places, it causes irregular astigmatism that makes images blurry. The greater the irregularity, the worse the blur becomes. Some of the symptoms of an irregular astigmatism become apparent when individual discover that they have minor vision changes, while others may experience more severe problems. Most people will tell the doctor that vision cannot be corrected to normal with glasses while some patients report severe glare at night or haziness around lights.

In accord, the etiology of irregular corneas may relate to congenital defects, eye injuries, burns, scarring after bacterial, viral, or fungal infections, corneal ulcers, prior eye surgery, severe dry eye, pterygium, pellucid marginal degeneration, and/or keratoconus. As such, a scleral contact lens may be required. And, while many advances have been made in the biocompatibility, and physical properties of lenses, significant problems still exist.

Possible contact lens disorders are listed in table. These disorders must be taken into account when comparing contact lenses to eye glasses or laser correction surgery. While taking out and removing contacts on a daily or weekly basis can be stressful, the eye can typically heal from contact lens disorders. This should be compared to laser surgery where a mistake can be fatally hazardous to the eye. The debate between contacts and laser surgery will increase in the future as laser surgery becomes more successful and contact lens manufacturers develop cheaper, 30 day extended wear lenses that have little risk of infection.

Some Common Contact lens Disorders

| Disorder | Description/Signs | Common/Possible Causes |
| --- | --- | --- |
| Allergic Conjunctivitis | Redness, flare, photophobia, haziness | Reaction to protein on lens |
| Papillary Conjunctivitis | Mucus, itching, increased papillae | Contact rubbing on tarsal conjunctiva |
| Infective Conjunctivitis | Irritation, redness, itching | Hydrophilic lenses can harbor infection |
| Toxic Conjunctivitis | Irritation, redness | Lens absorbs cleaning solution |
| Keratocinjunctivitis | Sudden onset of redness, and tearing | Edema, lens absorption of toxins |
| Punctate Keratopathy | Punctate lesions in cornea | Mechanical factor from lenses, or toxins from cleaning |
| Epithelial Microcysts | Development of epithelial microcyst | In extended wear lens users due to hypoxia |
| Subepithelial Keratitis | Round white/grey opaque circles on cornea | Antigen-antibody reaction to cleaning solution |
| Corneal Edema | Swelling of the cornea | Low Permeability |
| Corneal Ulcers | Formation of ulcers in the cornea | Lens infection/spoilage, immune reaction |
| Corneal Neovascularization | Deposition of lipids in stroma, loss of vision | Soft/Extended wear users, exact cause unknown |
| Corneal Strain | Cornea erosion | Strain do to improper fitting, improper cleaning, poor care |
| High Altitude Infection | Corneal edema/edema Irritation, redness, eye swelling | Hypoxia increases risk Lens Spoilage, infected lens, poor cleaning |

In addition to wearing scleral lenses, additional treatments may also be used in combination with procedures that may provide additional or synergistic benefits to the patient. Procedures known, proposed or considered to relieve visual impairment include but are not limited to "limited retinal translocation", photodynamic therapy (PDT, including, by way of example only, receptor-targeted PDT, Bristol-Myers Squibb, Co.; porfimer sodium for injection with PDT; verteporfin, QLT Inc.; rostaporfin with PDT, Miravent Medical Technologies; talaporfin sodium with PDT, Nippon Petroleum; motexafin lutetium, Pharmacyclics, Inc.), antisense oligonucleotides (including, by way of example, products tested by Novagali Pharma SA and ISIS-13650, Isis Pharmaceuticals), laser photocoagulation, drusen lasering, macular hole surgery, macular translocation surgery, implantable miniature telescopes, Phi-Motion Angiography (also known as Micro-Laser Therapy and Feeder Vessel Treatment), Proton Beam Therapy, microstimulation therapy, Retinal Detachment and Vitreous Surgery, Scleral Buckle, Submacular Surgery, Transpupillary Thermotherapy, Photosystem I therapy, use of RNA interference (RNAi), extracorporeal rheopheresis (also known as membrane differential filtration and Rheotherapy), microchip implantation, stem cell therapy, gene replacement therapy, ribozyme gene therapy (including gene therapy for hypoxia response element, Oxford Biomedica; Lentipak, Genetix; PDEF gene therapy, GenVec), photoreceptor/retinal cells transplantation (including transplantable retinal epithelial cells, Diacrin, Inc.; retinal cell transplant, Cell Genesys, Inc.), and acupuncture.

Predicate Lenses and Related Control Parameters

In illustrative embodiments, a reference lens or predicate lens is generated. Once this predicate has been obtained for a particular lens prescription, that spectrum of lens parameters, such as, but not limited to segment parameters relating to one or more of the base curve or base curvature of a lens, the dynamic curve or dynamic curve clearances of a lens, the limbal clearance or limbal clearance curve of a lens, and the scleral alignment, each of which are amenable to modification for adjusting associated control points of the subject contact lens selected from the central vault, mid-peripheral clearance, limbal clearance, and the scleral alignment, each of which are amenable to modification based on adjustments to an attendant segment parameter. In this respect, when a contact lens fitter wishes to modify an aspect of the central vault control point, in addition to adjusting the input parameters of the dynamic curve, segment parameters relating to the total sagittal depth are adjusted. Likewise, when the fitter wishes to modify an aspect of the mid-peripheral clearance control point, in addition to adjusting the input parameters of the dynamic curve, segment parameters relating to the base curve are adjusted. Should the fitter desire to modify the limbal clearance control point, in addition to adjusting the input parameters of the dynamic curve, segment parameters relating to the limbal clearance curve are adjusted. Finally, without adjusting the dynamic curve parameters, the scleral alignment control point can be modified by adjusting the peripheral curve alignment segment parameter, which includes adjusting the toric aspects of the peripheral curve as well, in some embodiments. See Charts A and B above.

Along these lines, the predicate lens can be modified based on the formulas and calculations provided herein. See, e.g., Examples. Statistical methods can be used to set thresholds for determining changes of unknown origin can be considered to be different than or similar to a predicate lens and/or reference level. In addition, statistics can be used to determine the validity of the difference or similarity observed between an unknown reordered phase of the reference level. Useful statistical analysis methods are described in L. D. Fisher & G. vanBelle, Biostatistics: *A Methodology for the Health Sciences* (Wiley-lnterscience, NY, 1993). For instance, confidence ("p") values can be calculated using an unpaired 2-tailed t test, with a difference between samples deemed significant if the p value is less than or equal to 0.05. See Examples for further explication of the formulas and algorithms germane to the present technology.

Manufacture of Scleral Lenses

In one aspect, the disclosure provides methods, systems and apparatuses for analyzing and/or making one or more types of lenses and comparing or correcting the lens based on distinguishing characteristic or properties as they relate to the predicate lens and consequently the needs of the patient.

There are at least three primary ways in which contact lenses are manufactured. The first method of manufacturing is referred to a lathe cutting. In this method, monomers are bulk polymerized into rods, and the rods are then cut into cylindrical discs, commonly called buttons, which are placed in the lathe. The lathe is then guided by computer to cut the button into a lens.

The second method of forming contacts is referred to as spin casting. In this method, the liquid monomer is placed in a mold, shaped to provide the anterior lens surface, and the mold is then rotated. The monomer is then polymerized inside the rotating mold, for example, by exposure to UV light and/or heat. This method produces a relatively low yield, but high quality lens. In spin casting, the posterior surface of the lens is defined by the centrifugal forces from spinning The lens surfaces can be varied by varying the speed of rotation, and/or the shape of the mold.

A third method for producing contact lenses is by cast molding. In this method, the monomer is placed into a two-part mold, with one mold part having a molding surface to define the anterior lens surface and the second mold part having a molding surface to define the posterior lens surface. The monomer is polymerized in the two-part mold by exposure to UV light and/or heat. The lens parameters are varied by changing the shape of the anterior and posterior molds. This method produces high yield, and high quality lenses. It is the most popular form of manufacturing for high volume contact lens production.

In the case of soft contact lenses, the lenses provided by the other methods are then hydrated.

Hard Contact Lenses: Approximately fifteen percent of the thirty million contact lens users wear what is known as hard contact lenses. There are several kinds of hard contact lenses, the most historic being impermeable hard contact lens, and now the most common are the rigid gas permeable (RGP) lens, and silicone acrylate based lenses. All of these lenses consist of an amorphous three dimensional polymer matrix (typically a MMA derivative) that is below its glass transition temperature. The lenses are typically very stiff and have a high modulus of elasticity. This gives them a high tear strength and very easy to handle.

The impermeable contact lens was the first type of hard contact to be developed. It consists of PMMA only. The MMA monomer is polymerized via ultra-violet or infrared radiation in the presence of cross-linkers and initiators. The lenses were then made by the lath cutting manufacturing process.

PMMA is an ideal polymer to be used for hard contact lenses because it is cheap and easy to make. It is moderately hydrophobic, which also contributes to it repelling proteins effectively. It has a typical oxygen permeability of 0.5 DK, which makes it effectively an impermeable membrane to oxygen and carbon dioxide. This impermeability is what restricts PMMA lenses from being used more than about 8 hours at a time.

This restriction has caused tremendous research in the area in hard contact lens permeability. It is possible to make theoretical calculations with respect to contact lenses by applying a modified version of Henry's law, and Fick's Law. The modified version of Henry's law for polymers below their glass transition temperature is as follows:

$$C = K_D p + C_H(bp/1+bp)$$

$$C = K_D p + C_H bp(bp \ll 1)$$

$$C = (K_D + C_H b)p$$

$$C = K'_D p$$

| Units for Henry's Law for Polymers Below Their Glass Transition Temperature | |
|---|---|
| C | Concentration of penetrant gas dissolve in polymer |
| $K_D$ | Solubility coefficient for penetrant |
| p | Gas pressure at solution equilibrium |
| $C_H$ | Langmuir mode concentration of sorbed gas |
| b | Gas affinity parameter |

Fick's law for glassy polymers is given as:

$$N = -D_D(dC_D/dx) - D_H(dC_H/dx)$$

This can be simplified as follows:

$$N = -D'_D(d/dx)(C_D + C_H)$$

$$N = -D'_D(dC'/dx)$$

| Symbols used in Fick's for Glassy Polymers | |
|---|---|
| N | rate of gas transfer per unit area |
| $D_D$ | Fick's diffusion coefficient |
| $C_D$ | Henry's concentration of sorbed gas |
| $D_H$ | diffusion coefficient for gas tapped |
| $C_H$ | gas population ($C_H < C_D$) |

These equations yield results that are reasonable, and that are in good agreement when applied to hard contact lenses. To gain the necessary data however one must know the free volume fraction of the polymer. Diffusion is heavily dependent upon the free volume because it is a measure of the polymers porosity. One possible way of finding this is by positron annihilation spectroscopy.

It is known that the impermeability of PMMA lenses could be overcome by copolymerizing methyl methacrylate (MMA) with a silicone acrylate. A scientist by the name Norman Gaylord copolymerized methacryloxypropyl tris (trimethysiloxy silane) (TRIS) with MMA, and the result was a polymer that had the strength of MMA, but also the oxygen permeability of silicone. Silicone is hydrophobic however, so the wetting agent methacrylic acid (MAA) was added to increase lens wettability. The PMMA-TRIS lens was the first RPG lens and was highly successful. Several other RGP lenses have received FDA approval for daily wear, and are in use today.

PMMA-TRIS lenses were problematic because TRIS is hydrophobic, and lipophilic. In addition, the lenses still did not have the permeability's required for extended wear. This caused many complications in the push to develop extended wear lenses, and increase biocompatibility. Looking for a solution, researchers began looking into doping MMA-TRIS lenses with Fluoromethacrylates. Recent research has shown that doping lenses with Fluoromethacrylates increases the free volume fraction. Increasing the free volume fraction is like adding lanes to the diffusion expressway. It gives oxygen and carbon dioxide more room to penetrate the lens. Thus, it efficiently increases the polymers permeability, hence increasing comfort and decreasing ocular strain. This increase in the polymers permeability along with varying the thickness of the lens created a RGP lenses that were approved for extended wear for up to seven days.

While hard contacts are not the most the most convenient they are very cost effective. They are polymerized in bulk, and then cut with a precision lathe. This allows them to be made very cheaply. In addition, their relative impermeability makes then very resistant to environment of the eye. They typically repel proteins and lipids very effectively. With proper maintenance the lenses can be used for several years. Hard lenses are also very durable, and their strength helps them resist scratching, and protect the cornea.

Soft Contact Lenses: The most popular type of contact lens is a soft lens. Soft contact lenses are made of thermo-set polymer hydrogels. Like hard contacts lens polymers, these gels are made up of a three dimensional, amorphous network with cross-links. The lenses are soft because the polymer is above its glass transition temperature. Soft contacts are typically formed using cast molding or the spin cast method. They can be produced by the lath cutting process, but this is less common.

In soft contact lenses, the water content affects many things. The permeability of the lens is proportional to the amount of water in the lens. As the percent weight of water increases in the lens, the permeability increases relatively linearly. The lenses ability to absorb various amounts of water also makes them highly hydrophilic. These attributes gives soft contact lenses the ability to achieve permeability's that allows them to be used for extended wear without damage to the eye. The increased permeability does not come freely however. As the water content is increased the polymers lose their strength. This can lead to tearing or scratching of the lens. A softer lens also offers the cornea less protection.

The first hydrogel contacts consisted of HEMA that was cross-linked with either ethylene dimethacrylate (EDMA) or ethylene glycol dimethacrylate (EGDMA). Future models of hydrogel lenses added the surfactants, methacrylic acid (MAA) and N vinyl pyrollidone (NVP) to increase water content. MMA is undesirable however because it makes the polymer ionic, which attracts proteins. HEMA has also been substituted with such monomers as glycerol methacrylate (GMA) that shows a higher resistance biofilm formation. Typical HEMA/MAA soft contact lenses have oxygen permeabilties of about 15-25 Barrers.

Improving soft contact lens permeability started with the development of hydrogel contact lenses made from silicone based polymers like polydimethylsiloxane (PDMS). The silicone hydrogel contact lens, also known as siloxane lenses, show impressive permeability (PDMS has a DK of 600 Barrers), while retaining the comfort, wettability, and biofilm resistance of non-silicon based hydrogels. Unlike hydrogel lenses however, the oxygen permeability of silicone hydrogels decreases exponentially as water content increases. As discussed in hard contact lenses, silicone is hydrophobic, so the wettability decreases as water content decreases. This led scientist to researching ways of making siloxane based lenses more wettable.

The use of fluorine doped side chains has also become increasingly popular as a method to further increase permeability. When coupled with siloxane, fluorine can effectively increase the permeability while also effectively resisting lipid deposits. The challenges encountered with fluorine, however, relate to the water-repelling characteristic that does not comport with all applications of such lenses. This leads them to cap fluorine chains with methacrylate with is less hydrophobic.

The surface chemistry of soft contact lenses is of great importance. While the soft contact lenses typically have acceptable diffusion rates, all methacrylic and acrylic hydrogels are hydrophobic to a certain extent. In fact, it has been shown that while the water content of a hydrogel helps its permeability, it not little or nothing to affect its wettability. In the case of siloxane lenses it is because the surfaces tend to consist of siloxane. Siloxane migrates to the surface of the lens during polymerization because of its desire of air. While siloxane is successful at repelling proteins, but it is highly hydrophobic which results in lipid and protein deposition on the lens. Initial research attempted to blend hydrophobic silicone based monomers with hydrophilic monomers. These attempts were unsuccessful however because the difference in hydrophilicity would cause phase separation. Recently with it has been shown that by grafting polyoxyethylene to the surface, the lens effectively repels protein and lipids, and increased wettability. Improved surfactants consisting of random copolymers of lauryl-, hexyl-, and methyl-methacrylate and polyethylene glycol methacrylate, have also shown a lot of promise. The surfactants are bound to the surface during the actual making of the lens. The surfactant monomers are added to the contact lens monomers, and the surfactants moved to the surface during lens the creation of the lens because they have a higher desire for air then siloxane. Covalent bonds are then formed as the silicones of the gel matrix appear. Currently silicone hydrogel lenses have DK's have about 50-200 Barrers, however none of these lenses currently in commercially available.

Attempts to improve the wettability of soft contact lenses have also been made on the manufacturing side of processing. Research has shown that by polymerizing the contact in polar molds effectively increased the wettability of the lens. This is because the charge distribution on the mold attracts charges to the surface of the lens while it is forming. Once the charges are at the surface of the lens, they are polymerized, and consequently forced to stay at the surface. The water in tears is then attracted to this polar surface of the lens.

Different and additional components can also be incorporated into the methods, systems and apparatuses detailed herein, in illustrative embodiments. For example, in particular embodiments, the apparatus of the present disclosure also includes, but is not limited to including, a computing system with one or more input interfaces, a communication interface, computer-readable medium, an output interface, a processor, a data processing application, a display, and a printer. Different and additional components may be incorporated into the apparatus for modification of a contact lens for a desired application. In this regard, computer-readable medium is an electronic holding place or storage for information so that the information can be accessed by a processor as known to those skilled in the art. Computer-readable medium may include, but is not limited to, any type of random access memory (RAM), any type of read only memory (ROM), any type of flash memory, etc. such as magnetic storage devices, e.g., hard disk, floppy disk, magnetic strips, etc., optical disks, e.g., CD, DVD, etc., smart cards, flash memory devices, etc. Such a computing system may have one or more computer-readable media that use the same or a different memory media technology. In illustrative embodiments, the computing system may include a plurality of processors that use the same or a different processing technology for discriminating or differentiating various control points and/or parameters based on medical necessity.

In illustrative embodiments, the apparatus disclosed herein include, but are not limited to, light sources, such as a laser, as well as optics and filters to present the laser light to the sample and facilitate collection of the data. The optics can be fiber optics for increased compactness. The apparatus can also comprise an inverted and phase contrast microscope, atomic force microscope, CCD camera, compact fiber based spectrometers, computer, software, and a flow cell sample collection system. The computer and the software may be automated to obtain one or more orientations and perform an analysis on the acquired data. Subsequently, the results can be manually or automatically compared to a known, derived, or empirical database to characterize or identify the characteristics of the lens and/or the adjustment needed.

Data processing applications are also disclosed, which perform operations associated with processing data for a sample gathered using one or more electronic devices that continuously, periodically, and/or upon request monitor, sense, measure, etc. the physical and/or chemical characteristics of the lens, predicate lens, and/or other features of the present technology as disclosed herein. The operations may be implemented using hardware, firmware, software, or any combination of these methods. For example, data processing applications are implemented in software (comprised of computer-readable and/or computer-executable instructions) stored in computer-readable media and accessible by a processor for execution of the instructions that embody the operations of data processing application. See Examples. Data processing application may be written using one or more programming languages, assembly languages, scripting languages, etc.

Likewise, image data generating systems may store image data in a database, which may include any type of storage architecture. Storage architectures include files in a file system, native XML databases, relational databases, SQL databases, etc., and may also comprise a file system including a plurality of data files. Such databases may be accessed from various computing device linked to a Lathe cutting machine using various communication interfaces and/or may be stored in computer readable medium.

Computer-readable media are an electronic holding place or storage for information so that the information can be accessed by processors as known to those skilled in the art. Computer-readable media can include, but is not limited to, any type of random access memory (RAM), any type of read only memory (ROM), any type of flash memory, etc. such as magnetic storage devices (e.g., hard disk, floppy disk, magnetic strips, etc.), optical disks (e.g., CD, DVD, etc.), smart cards, flash memory devices, etc. Computing devices may have one or more computer-readable media that use the same or a different memory media technology. Such devices also may have one or more drives that support the loading of a memory media such as a CD or DVD. Computer-readable media, as known in the art, may comprise a cache in which data can be stored temporarily for rapid access by a processor.

Communication interfaces provide an interface for receiving and transmitting data between devices using various protocols, transmission technologies, and media as known to those skilled in the art. The communication interface may support communication using various transmission media that may be wired or wireless. Such devices may have one or more communication interfaces that use the same or a different communication interface technology. Data may be transferred between computing devices and image data generation systems using communication interfaces associated with the input software of the present invention as connected to a lathe cutting machine. Additionally, communication interfaces may provide connectivity to other systems and databases.

EXAMPLES

The present methods, systems and technologies, thus generally described, will be understood more readily by reference to the following examples, which are provided by way of illustration and are not intended to be limiting. The following is a description of the materials and experimental procedures used in the Examples.

The initial designing of a contact lens of the present invention includes the parameter "$S_{TOTAL}$" as used herein, which refers to the total Sag of the entire lens. In some embodiments, the description and examples impart the method and manufacture of a design for a complete lens with a dynamic curve indications. In suitable embodiments, the present methods account for peripheral curve sagittal component vectors. Likewise, adjustments to the central clearance, mid-peripheral clearance, and limbal clearance are provided for in illustrative embodiments. Along the same lines, one aspect of the present invention entails a method for designing a lens with dynamic curve as detailed above and more fully explicated in view of the Examples below. As such, the present technology relates to both methods for ad hoc contact lens design and manufacture in concert with perfecting the control points and parameters of such a contacts lens by adjusting clearance values with respect to referenced predicate lens.

In the empirical examples outlined below, a scleral contact lens with four sagittal components is typically provided at the outset. Each segment has a Radius, a Chord Diameter, and Sagittal Depth component. As defined in illustrative embodiments, "$S_{TOTAL}$" is the sagittal depth total of the entire lens, where "ST" is the sagittal depth total of the first three sagittal components. When making adjustments to lens clearance in certain embodiments, "SD" is not taken in to account in some embodiments as the lens makes contact with the sclera at "DC." In some embodiments, SD is only used to adjust the lenses peripheral curves to the angle of the sclera. "RD" is only adjusted to alter the alignment of the peripheral curves to the angle of the sclera. "SB/RB" is the Dynamic curve, i.e., it is always calculated in some embodiments, where all other curves are specified, in illustrative embodiments. See Table below; see also FIGS. 1-2.

| Segment | Radius of Curvature | Chord Diameter | Sagittal Component |
| --- | --- | --- | --- |
| Base Curve | RA | DA | SA |
| Dynamic Curve | RB | DB | SB |
| Limbal Clearance Curve | RC | DC | SC |
| Peripheral Curves(s) | RD | DD | SD |

Example 1—Designing a Lens Using Dynamic Curve Technology

Many scleral contact lenses are defined by their radii and chord diameters. The total sagittal depth of the lens is then calculated by adding all radii's sagittal components. This novel approach to designing a contact lens allows the designer to specify all but one radius, all chord diameters, and the total sagittal depth of the lens. The unspecified radius then calculated to achieve a lens with the desired total sagittal depth. See charts below.

| I(A) | | Radius | | | | Chord Diameter | |
|---|---|---|---|---|---|---|---|
| Base Curve | RA | 7.60 | Specified | DA | 9.00 | Specified | |
| Dynamic Curve | RB | 6.41 | =SQRT(((((DA/2)^2) + ((((((DB/2)^2) − ((DA/2)^2) + (SB^2))/(2*SB))^2))) | DB | 11.40 | Specified | |
| Limbal Clearance Curve | RC | 7.90 | Specified | DC | 13.00 | Specified | |
| Peripheral Curve | RD | 13.00 | Specified | DD | 16.00 | Specified | |

| I(B) | | Sagittal Component | | | Sag Cumulative | |
|---|---|---|---|---|---|---|
| Base Curve | SA | 1.475 | =RA − sqrt(RA^2 − (DA/2)^2) | | 1.475 | =SA |
| Dynamic Curve | SB | 1.633 | =Stotal − SD − SC − SA | | 3.109 | =SA + SB |
| Limbal Clearance Curve | SC | 0.980 | =RC − sqrt(RC^2 − (DC/2^2) − RC − sqrt(RC^2 − (DB/2)^2) | | 4.089 | =SA + SB + SC |
| Peripheral Curve | SD | 1.011 | =RD − sqrt(RD^2 − (DD/2^2 − RD − sqrt(RC^2 − (DO/2)^2) | Stotal | 5.100 | Specified |

| II(A) | | Radius | | | | Chord Diameter | |
|---|---|---|---|---|---|---|---|
| Base Curve | RA | 8.20 | Specified | DA | 9.00 | Specified | |
| Dynamic Curve | RB | 6.84 | =SQRT(((((DA/2)^2) + ((((((DB/2)^2) − ((DA/2)^2) + (SB^2))/(2*SB))^2))) | DB | 11.40 | Specified | |
| Limbal Clearance Curve | RC | 8.30 | Specified | DC | 13.00 | Specified | |
| Peripheral Curve | RD | 13.00 | Specified | DD | 16.00 | Specified | |

| II(B) | | Sagittal Component | | | Sag Cumulative | |
|---|---|---|---|---|---|---|
| Base Curve | SA | 1.345 | =RA − sqrt(RA^2 − (DA/2)^2) | | 1.345 | =SA |
| Dynamic Curve | SB | 1.372 | =Stotal − SD − SC − SA | | 2.717 | =SA + SB |
| Limbal Clearance Curve | SC | 0.872 | =RC − sqrt(RC^2 − (DC/2^2 − RC − sqrt(RC^2 − (DB/2)^2) | | 3.589 | =SA + SB + SC |
| Peripheral Curve | SD | 1.011 | =RD − sqrt(RD^2 − (DD/2^2 − RD − sqrt(RC^2 − (DO/2)^2) | Stotal | 4.600 | Specified |

As detailed in the two exemplary charts above, the lens designer has specified certain parameters, as follows: (RA) Base Curve Radius; (RC) Limbal Clearance Curve Radius; (RD) Peripheral Curve Radius; (DA) Base Curve Chord Diameter; (DB) Dynamic curve Chord Diameter; (DC) Limbal Clearance Curve Chord Diameter; (DD) Peripheral Curve Chord Diameter; and the ($S_{TOTAL}$) The Total Sagittal Depth. With these parameters now being static, i.e., subsequent to the lens fitter's specifications, each of the Sagittal Components can then be calculated as shown below.

| Notation | Parameter | Formula/Calculation |
|---|---|---|
| (SA) | Base Curve | = RA − sqrt(RA^2 − (DA/2)^2) |
| (SC) | Limbal Clearance Curve | = RC − sqrt(RC^2 − (DC/2)^2) − RC − sqrt(RC^2 − (DB/2)^2) |
| (SD) | Peripheral Curve | = RD − sqrt(RD^2 − (DD/2)^2) − RD − sqrt(RC^2 − (DC/2)^2) |
| (SB) | Dynamic Curve Sagittal Component | = Stotal − SD − SC − SA |

-continued

| Notation | Parameter | Formula/Calculation |
|---|---|---|
| (RB) | Dynamic Curve Radius | = SQRT((((DA/2)^2) + ((((((DB/2)^2) − ((DA/2)^2) + (SB^2))/(2*SB))^2))) |

Example 2—Modifying Central Vault (Central Clearance)

Figure 3:
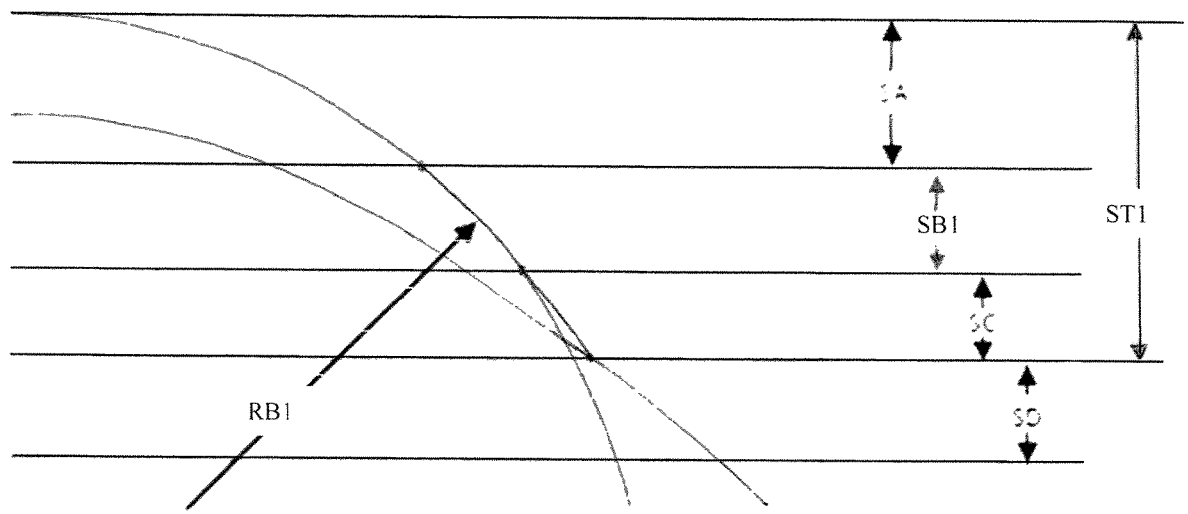
FIG. 3 is a graphical representation of a lens with modified central clearance.

Insofar as the lens fitter decides that more central clearance is needed than a predicate lens. ST1=ST+additional central clearance (ST from FIG. 2B, predicate lens). SA and SC are static. SB1=ST1−SA−SC. RB1 is recalculated using the Lenticular Radius Formula to achieve the SB1 sagittal component. All other lens parameters/fitting characteristics remain unchanged. The lens fitter decides that less central clearance is needed than a predicate lens provides. ST1=ST−decreased central clearance (ST from FIG. 2B, predicate lens). See FIG. 3. Also, once central clearance is observed, a slit lamp exam (SLE) cross-section view may be used to determine the amount of clearance.

|  |  | Sagittal Component |  |  | Sag Cumulative |  |
|---|---|---|---|---|---|---|
| Predicate Lens |  |  |  |  |  |  |
| Base Curve | SA | 1.475 | =RA − sqrt(RA^2 − (DA/2)^2) |  | 1.475 | =SA |
| Dynamic Curve | SB | 1.634 | =ST − SC − SA |  | 3.109 | =SA + SB |
| Limbal Clearance Curve | SC | 0.980 | =RC − sqrt(RC^2 − (DC/2^2 − RC − sqrt(RC^2 − (DB/2)^2)) | ST | 4.089 | Specified |
| Adjusted Lens |  |  |  |  |  |  |
| Base Curve | SA | 1.475 | =RA − sqrt(RA^2 − (DA/2)^2) |  | 1.475 | =SA |
| Dynamic Curve | SB1 | 1.734 | =ST1 − SA − SC |  | 3.209 | =SA + SB |
| Limbal Clearance Curve | SC | 0.980 | =RC − sqrt(RC^2 − (DC/2^2 − RC − sqrt(RC^2 − (DB/2)^2)) | ST1 | 4.189 | =ST + Additional |

|  |  | Radius |  |  | Chord Diameter |  |
|---|---|---|---|---|---|---|
| Predicate Lens |  |  |  |  |  |  |
| Base Curve | RA | 7.60 | Specified | DA | 9.00 | Specified |
| Dynamic Curve | RB | 6.41 | =SQRT((((DA/2)^2) + ((((((DB/2)^2) − ((DA/2)^2) + (SB^2))/(2*SB))^2))) | DB | 11.40 | Specified |
| Limbal Clearance Curve | RC | 7.90 | Specified | DC | 13.00 | Specified |
| Adjusted Lens |  |  |  |  |  |  |
| Base Curve | RA | 7.60 | Specified | DA | 9.00 | Specified |
| Dynamic Curve | RB1 | 6.29 | =SQRT((((DA/2)^2) + ((((((DB/2)^2) − ((DA/2)^2) + (SB^2))/(2*SB))^2))) | DB | 11.40 | Specified |
| Limbal Clearance Curve | RC | 7.90 | Specified | DC | 13.00 | Specified |

Example 3—Modifying Mid-Periphery Clearance

Figure 4:
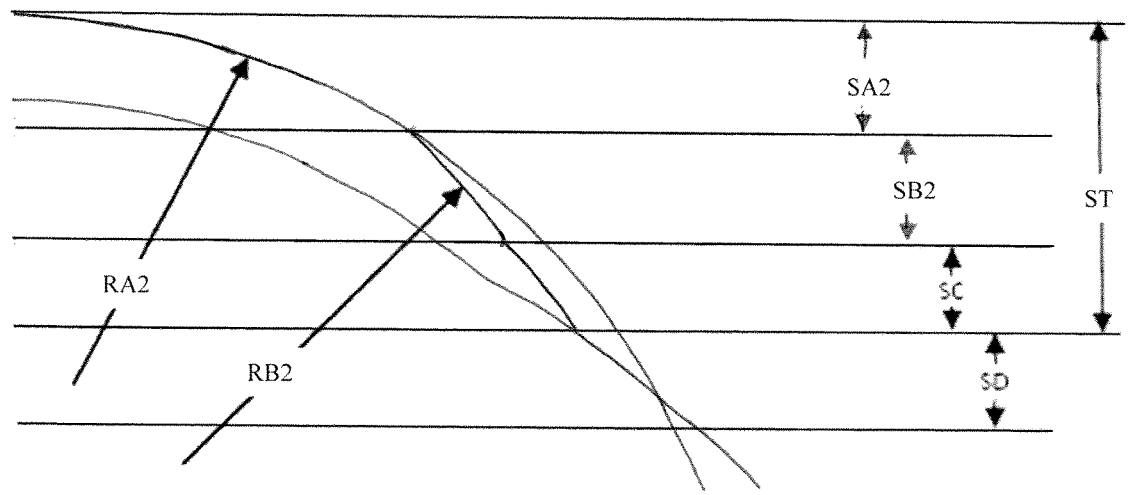
FIG. 4 is a graphical representation of a lens with modified mid-peripheral curve.

Modifying Mid-Periphery Clearance—The lens fitter decides that more mid-periphery clearance is needed than a predicate lens, or if the fitter needs a flatter base curve radius for optical reasons or other. RA2 is increased (a larger radius), this yields a smaller SA2 than the predicate lens' SA. ST and SC are static. SB2=ST−SA2−SC. RB2 is recalculated using the Lenticular Radius Formula to achieve the SB2 sagittal component. All other lens parameters/fitting characteristics remain unchanged. The lens fitter decides that less mid-periphery clearance is needed than a predicate lens, or if the fitter needs a steeper base curve radius for optical reasons or other. RA2 is decreased (a smaller radius), this yields a larger SA2 than the predicate lens' SA. See FIG. 4 and Table below.

|  |  | Radius |  |  | Chord Diameter |  |
|---|---|---|---|---|---|---|
| Predicate Lens |  |  |  |  |  |  |
| Base Curve | RA | 7.60 | Specified | DA | 9.00 | Specified |
| Dynamic Curve | RB | 6.41 | =SQRT((((DA/2)^2) + ((((((DB/2)^2) − ((DA/2)^2) + (SB^2))/(2*SB))^2))) | DB | 11.40 | Specified |
| Limbal Clearance Curve | RC | 7.90 | Specified | DC | 13.00 | Specified |
| Adjusted Lens |  |  |  |  |  |  |
| Base Curve | RA2 | 7.90 | Specified | DA | 9.00 | Specified |
| Dynamic Curve | RB2 | 6.33 | =SQRT((((DA/2)^2) + ((((((DB/2)^2) − ((DA/2)^2) + (SB^2))/(2*SB))^2))) | DB | 11.40 | Specified |
| Limbal Clearance Curve | RC | 7.90 | Specified | DC | 13.00 | Specified |

|  |  | Sagittal Component |  |  | Sag Cumulative |  |
|---|---|---|---|---|---|---|
| Predicate Lens |  |  |  |  |  |  |
| Base Curve | SA | 1.475 | =RA − sqrt(RA^2 − (DA/2)^2) |  | 1.475 | =SA |
| Dynamic Curve | SB | 1.634 | =ST − SC − SA |  | 3.109 | =SA + SB |

-continued

| | | | | | | |
|---|---|---|---|---|---|---|
| Limbal Clearance Curve | SC | 0.980 | =RC − sqrt(RC^2 − (DC/2^2 − RC − sqrt(RC^2 − (DB 2)^2) | ST | 4.089 | Specified |
| Adjusted Lens | | | | | | |
| Dynamic Curve | SA2 | 1.407 | =RA − sqrt(RA^2 − (DA/2)^2) | | 1.407 | =SA |
| Smart Curve | SB2 | 1.702 | =ST − SA2 − SC | | 3.109 | =SA + SB |
| Limbal Clearance Curve | SC | 0.980 | =RC − sqrt(RC^2 − (DC/2^2 − RC − sqrt(RC^2 − (DB2)^2) | ST | 4.089 | Specified |

Example 4—Modifying Limbal Clearance

Figure 5:
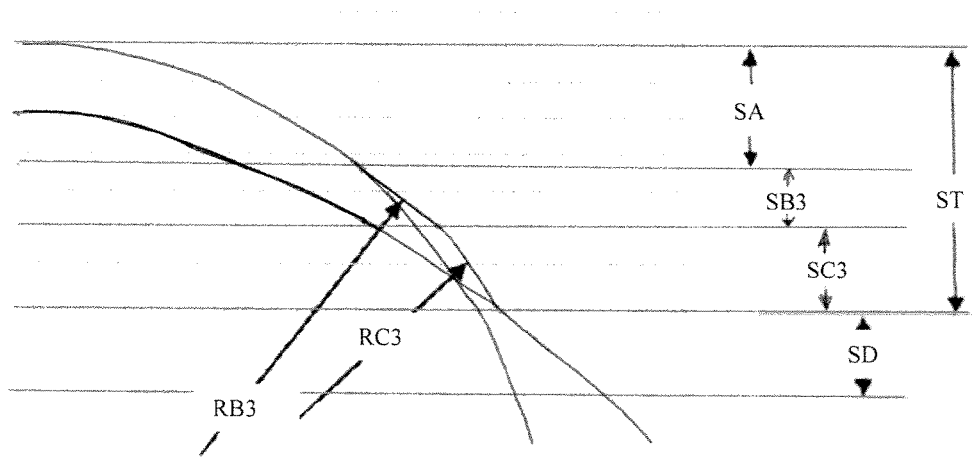
FIG. 5 is a graphical representation of a lens with modified limbal clearance.
Figure 6:
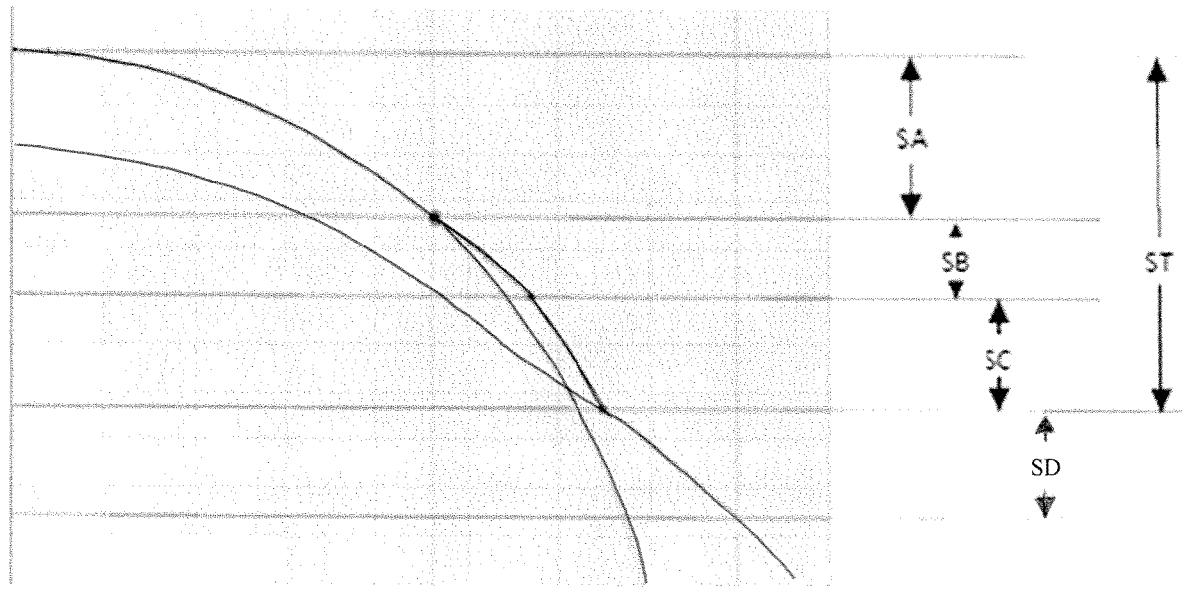
FIG. 6 is a graphical representation of a scleral lens with modified peripheral curves.
Figure 7A:
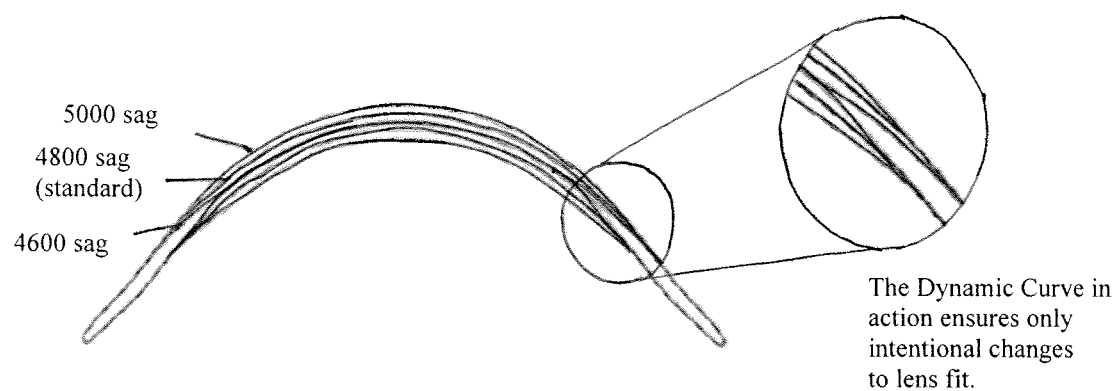
FIGS. 7A and 7B show illustrative representations of a constant dynamic curve base curve despite adjustment to other parameters, and the back surface of a predicate lens, respectively.
Figure 7B:
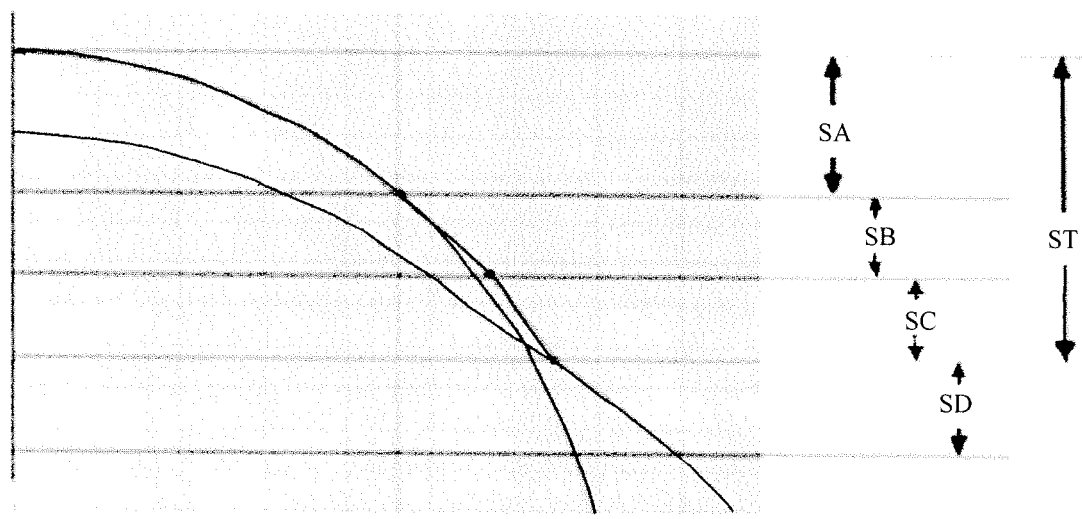

Modifying limbal clearance—The lens fitter decides that more limbal clearance is needed than the predicate lens. For example, a scleral lens should exhibit clearance beyond the limbus. RC3 is decreased (a smaller radius), this yields a larger SC3 than the predicate lens' SC. ST and SA are static. SB3=ST−SA−SC3. RB3 is recalculated using the Lenticular Radius Formula to achieve the SB3 sagittal component. All other lens parameters/fitting characteristics remain unchanged. The lens fitter decides that less limbal clearance is needed than the predicate lens. RC3 is increased (a larger radius), this yields a smaller SC3 than the predicate lens' SC. Follow same procedure as above. See FIG. 5 which shows a lens with modified limbal clearance; see also FIG. 6 which shows a lens with modified peripheral curves. If necessary, a larger diameter lens may be used to ensure adequate limbal clearance.

| | | Radius | | | Chord Diameter | |
|---|---|---|---|---|---|---|
| Predicate Lens | | | | | | |
| Base Curve | RA | 7.60 | Specified | DA | 9.00 | Specified |
| Dynamic Curve | RB | 6.41 | =SQRT((((DA/2)^2) + ((((((DB/2)R2) − ((DA/2)^2) + (SB^2))/(2*SB)) − 2))) | DB | 11.40 | Specified |
| Limbal Clearance Curve | RC | 7.90 | Specified | DC | 13.00 | Specified |
| Adjusted Lens | | | | | | |
| Base Curve | RA | 7.60 | Specified | DA | 9.00 | Specified |
| Dynamic Curve | RB | 6.63 | =SQRT((((DA/2)^2) + ((((((DB/2)^2) − ((DA/2)^2) + (SB^2))/(2*SB))^2))) | DB | 11.40 | Specified |
| Limbal Clearance Curve | RC3 | 7.50 | Specified | DC | 13.00 | Specified |

| | | Sagittal Component | | | Sag Cumulative | |
|---|---|---|---|---|---|---|
| Predicate Lens | | | | | | |
| Base Curve | SA | 1.475 | =RA − sqrt(RA^2 − (DA/2)^2) | | 1.475 | =SA |
| Dynamic Curve | SB | 1.634 | =ST − SC − SA | | 3.109 | =SA + SB |
| Limbal Clearance Curve | SC | 0.980 | =RC − sqrt(RC^2 − (DC/2^2 − RC − sqrt(RC^2 − (DB/2)^2) | ST | 4.089 | Specified |
| Adjusted Lens | | | | | | |
| Base Curve | SA | 1.475 | =RA − sqrt(RA^2 − (DA/2)^2) | | 1.475 | =SA |
| Dynamic Curve | SB3 | 1.481 | =ST − SA − SC3 | | 2.956 | =SA + SB |
| Limbal Clearance Curve | SC3 | 1.133 | =RC − sqrt(RC^2 − (DC/2^2 − RC − sqrt(RC^2 − (DB/2) − 2) | ST | 4.089 | Specified |

When modifying the peripheral curve alignment, if the lens fitter decides to change the peripheral curves of the lens to better align with the scleral, no adjustments to the dynamic curve are necessary, in suitable embodiments.

Summary and Additional Embodiments/Considerations

The dynamic curve technology of the present invention provides for, or allows the contact lens fitter to make, adjustments in lens clearance at one or more, e.g., three, distinct points by changing a single parameter per point. Changes to any parameter affect the lens clearance at the desired point only, and do no change the lens clearance at the other undesired control points. The alignment of the peripheral curves, moreover, can be modified with respect to the scleral setting without affecting the clearance of lens at any of the previous points, unless such alterations are desired.

As outlined above, examples of scleral lens embodiments and applications include, but are not limited to, uses for irregular corneas, but the invention could be used for normal corneas also. Examples further concern rigid gas permeable contact lenses, the invention could be used for hybrid contact lenses also (rigid center material, soft hydrophilic skirt), as well, however. The invention is directed to illustrative embodiments some of which are suitable for rigid gas permeable contact lenses, the invention could be used for hybrid contact lenses also (rigid center material, soft hydrophilic skirt), and/or for hydrophilic soft contact lenses. In some embodiments, hydrophilic soft contact lenses are not appropriate, in illustrative embodiments, the scleral lenses must rest on the sclera (white part of the eye). Rigid gas permeable contact lens material or hybrid contact lenses are used in some aspects of the present invention.

Furthermore, the scleral lenses of the present invention have been manufactured using a variety of materials, configurations, and devices inasmuch as a predicate lens required adjustments. In this regard, mini-scleral, fully vaulting lens provides for fitting a wide variety of corneal shapes and sizes using a single fitting set and fitting philosophy, in some embodiments. In some embodiments, the present technology provides for a fundamentally well designed scleral with refined peripheral curves and generous landing zone. Likewise, lens diameters ranging from about 0.01, 0.1, 1, 2, 5, 10, 15, 20, 25, 30, 35 or 40 mm to from about 0.1, 1, 2, 5, 10, 15, 20, 25, 30, 35, 40 or 50 mm are within the scope of the present disclosure. In illustrative embodiments, lens diameters ranges from about 0.01, 0.1, 1, 2, 5, 10, 15, 20, 25, 30, 35 or 40 mm to from about 0.1, 1, 2, 5, 10, 15, 20, 25, 30, 35, 40 or 50 mm. In suitable embodiments, lens diameters ranges from about 10, 15 or 20 mm to from about 15, 20 or 25 mm. In illustrative embodiments, the lens diameter is from about 16.0 mm to about 17.0 mm.

In this regard, illustrative embodiments providing for lens diameters from about 16.0 mm to about 17.0 mm allow for a breadth of corneal sizes to be accommodated. In some embodiments, prolate and oblate designs are manufactured to fit a wide range of corneal shapes. The Dynamic curve technology of the present disclosure enables personalized design options to fine-tune optics and physical fit in concert with customized to any and/or all parameters. In some embodiments, toric peripheral curves, customized center thickness, flexure controlling profiles, and front toric prescriptions are manufactured as a batch of one.

In short, one of the key aspects of the present invention relates to the ability to zero in on only the parameter modifications needed to make a perfectly fitting scleral contact lens. Along these lines, when a parameter modification is made, the present technology imparts an automatically engaging formula to ensure all other design attributes remain consistent, which consequently allows for the fine adjustments concerning only the parameter requiring modification (base curve, limbal clearance curve and peripheral curves, effective sag).

The present invention is not to be limited in terms of the particular embodiments described in this application, which are intended as single illustrations of individual aspects of the invention. Many modifications and variations of this invention can be made without departing from its spirit and scope, as will be apparent to those skilled in the art. Functionally equivalent methods and apparatuses within the scope of the invention, in addition to those enumerated herein, will be apparent to those skilled in the art from the foregoing descriptions. Such modifications and variations are intended to fall within the scope of the appended claims. The present invention is to be limited only by the terms of the appended claims, along with the full scope of equivalents to which such claims are entitled. It is to be understood that this invention is not limited to particular methods, reagents, compounds compositions or biological systems, which can, of course, vary. It is also to be understood that the terminology used herein is for the purpose of describing particular embodiments only, and is not intended to be limiting. In addition, where features or aspects of the disclosure are described in terms of Markush groups, those skilled in the art will recognize that the disclosure is also thereby described in terms of any individual member or subgroup of members of the Markush group. As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, tenths, etc.

As a non-limiting example, each range discussed herein can be readily broken down into a lower third, middle third and upper third, etc. As will also be understood by one skilled in the art all language such as "up to," "at least," "greater than," "less than," and the like, include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

All patents, patent applications, provisional applications, and publications referred to or cited herein are incorporated by reference in their entirety, including all figures and tables, to the extent they are not inconsistent with the explicit teachings of this specification. While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims. All references cited herein are incorporated by reference in their entireties and for all purposes to the same extent as if each individual publication, patent, or patent application was specifically and individually incorporated by reference in its entirety for all purposes.

What is claimed is:

1. A method of designing and manufacturing a scleral contact lens for a user, comprising:
   (a) defining segment parameters for a surface of a scleral contact lens comprising a base curve segment positioned in a central portion of the lens, a dynamic curve segment peripherally surrounding the base curve segment, a limbal clearance curve segment peripherally surrounding the dynamic curve segment, and a peripheral curve segment peripherally surrounding the limbal clearance curve segment, wherein the base curve segment is defined by segment parameter components comprising a base curve sagittal component SA, a base curve radius component RA, and a base curve chord diameter component DA, the dynamic curve segment is defined by segment parameter components comprising a dynamic curve sagittal component SB, a dynamic curve radius component RB, and a dynamic curve chord diameter component DB, the limbal clearance curve segment is defined by segment parameter components comprising a limbal clearance curve sagittal component SC, a limbal clearance curve radius component RC, and a limbal clearance curve chord diameter component DC, the peripheral curve segment is defined by segment parameter components comprising a peripheral curve sagittal component SD, a peripheral curve radius component RD, and a peripheral curve chord diameter component DD;
   (b) specifying each of the segment parameter components RA, RC, RD, DA, DB, DC, DD and a total sagittal clearance $S_{TOTAL}$ comprising the sum of SA, SB, SC and SD for the scleral contact lens;
   (c) calculating the dynamic curve radius RB and each of the sagittal components SA, SB, SC and SD based on the specified parameter components RA, RC, RD, DA, DB, DC, DD and $S_{TOTAL}$ according to the following algorithms;

| Notation | Parameter | Formula/Calculation |
|---|---|---|
| (SA) | Base Curve Sagittal Component | = RA − sqrt(RA^2 − (DA/2)^2) |
| (SC) | Limbal Clearance Curve Sagittal Component | = RC − sqrt(RC^2 − (DC/2)^2) − RC − sqrt(RC^2 − (DB/2)^2) |
| (SD) | Peripheral Curve Sagittal Component | = RD − sqrt(RD^2 − DD/2)^2) − RD − sqrt(RC^2 − (DC/2)^2) |
| (SB) | Dynamic Curve Sagittal Component | = Stotal − SD − SC − SA |
| (RB) | Dynamic Curve Radius | = SQRT(((DA/2)^2) + ((((((DB/2)^2) − ((DA/2)^2)) + (SB^2)/(2*SB))^2))) | and
   (d) forming a scleral contact lens to have a surface corresponding to the specified parameter components RA, RC, RD, DA, DB, DC, DD and $S_{TOTAL}$ and calculated parameters components RB, SA, SB, SC and SD.

2. The method of claim 1 further comprising using the designed lens as a predicate lens, determining one or more control point sites of the predicate lens that require adjusting for design of an adjusted scleral contact lens for a user; altering one or more of the predicate lens specified or calculated parameter components for adjusting the control point sites requiring adjustment, wherein a change in one or more of the parameter components for each of the one or more segment parameters is associated with a corresponding change at the one or more control point sites, and further wherein changes to any single segment parameter modify the adjusted contact lens design at a desired control point site of the one or more control point sites and do not modify the adjusted contact lens design at undesired control point sites of the one or more control point sites; and forming an adjusted scleral contact lens having a surface corresponding to the adjusted contact lens design.

3. The method of claim 2, wherein the one or more control points are selected from the group consisting of a central vault clearance, a mid-peripheral clearance, a limbal clearance and a scleral alignment angle, and combinations thereof.

4. The method of claim 3, wherein changes to the peripheral curve in the adjusted scleral contact lens relative to the predicate lens correspond to changes in the scleral alignment angle control point.

5. The method of claim 3, wherein changes to the dynamic curve sagittal component and/or the total sagittal clearance in the adjusted scleral contact lens relative to the predicate lens correspond to changes in the central vault clearance control point.

6. The method of claim 3, wherein changes to the dynamic curve sagittal component and/or the base curve sagittal component in the adjusted scleral contact lens relative to the predicate lens correspond to changes in the mid-peripheral clearance control point.

7. The method of claim 3, wherein changes to the dynamic curve sagittal component and/or the limbal sagittal component in the adjusted scleral contact lens relative to the predicate lens correspond to changes in the limbal clearance control point.

8. The method of claim 3, wherein the base curve, dynamic curve, limbal clearance curve and peripheral curve are the segment parameters for a spherical curve.

9. The method of claim 3, wherein the base curve, dynamic curve, limbal clearance curve and peripheral curve are the segment parameters for an aspheric curve.

10. The method of claim 9, wherein the aspheric curve is selected from the group consisting of conical sections, polynomials, splines, straight lines, angled lines, tapered lines, polygonal curves, rectangular, square, circular, diagonal, concentric, patterned, perimetric, hexagonal, or triangular configurations, or any free form line possessing a start point, an end point, and connects two defined points in space, and/or other shapes that are congruent for use as a sagittal component.

11. The method of claim 3, further comprising defining one or more additional segment parameter curves and/or one or more additional control points selected from the group consisting of one or more curves and/or sagittal components, wherein all the curves and/or sagittal components are defined for the contact lens other than the dynamic curve, and wherein the dynamic curve is calculated to achieve a desired total sagittal clearance.

12. The method of claim 11, wherein the one or more additional segment parameter curves are selected from the group consisting of one or more additional base curves, dynamic curves, limbal clearance curves and peripheral curves, and combinations thereof.

13. The method of claim 3, wherein the adjusted scleral contact lens is formed by a lathe with a cutting tool, where the sagittal component of the dynamic curve for the adjusted scleral contact lens is an input parameter for the lathe.

14. The method of claim 3, wherein (i) a change in the central vault clearance control point in the adjusted scleral contact lens relative to the predicate lens corresponds to changes to the dynamic curve sagittal component and to the total sagittal clearance of the lens, (ii) a change in the mid-peripheral clearance control point in the adjusted scleral contact lens relative to the predicate lens corresponds to changes to the dynamic curve sagittal component and to the base curve sagittal component, and (iii) a change in the limbal clearance control point in the adjusted scleral contact lens relative to the predicate lens corresponds to changes to the dynamic curve sagittal component and the limbal sagittal component.

15. The method of claim 14, wherein the base curve, dynamic curve, limbal clearance curve and peripheral curve are segment parameters for a spherical curve.

16. The method of claim 14, further comprising adjusting a scleral alignment angle of the adjusted lens to be manufactured relative to the predicate lens by adjusting one or more component of the peripheral curve segment of the predicate lens.

17. The method of claim 14, wherein each of the base curve radius component, the dynamic curve radius component, and the limbal clearance curve radius component represent radii of curvature for arcs with respect to a central optical axis of the contact lens, and further comprising performing at least one of (iv)-(vi):

(iv) based on a specification of an adjustment to the total sagittal clearance of the predicate lens, changes to the dynamic curve sagittal component and dynamic curve radius component of the predicate lens are calculated to effect changes in the central vault clearance control point of the adjusted lens to be manufactured, in accordance with the algorithms
ST1=Specified
SB1=ST1−SA−SC
and
RB1=SQRT(((DA/2)^2)+((((((DB/2)^2)−((DA/2)^2)+(SB1^2))/(2*SB1))^2))), wherein ST1 is the specified adjusted total sagittal clearance, SB1 is the calculated changed dynamic curve sagittal component, and RB1 is the calculated changed dynamic curve radius component, (v) based on a specification of an adjustment to the base curve radius of the predicate lens and changes to the dynamic curve sagittal component, the dynamic curve radius component and the base curve sagittal component of the predicate lens are calculated to effect changes in the mid-peripheral clearance control point of the adjusted lens to be manufactured, in accordance with the algorithms
RA2=Specified
SA2=RA2−sqrt(RA2^2−(DA/2)^2)
SB2=ST−SA2−SC
and
RB2=SQRT(((DA/2)^2)+((((((DB/2)^2)−((DA/2)^2)+(SB2^2))/(2*SB2))^2))), wherein RA2 is the specified adjusted base curve radius, SA2 is the calculated changed base curve sagittal component, SB2 is the calculated changed dynamic curve sagittal component, and RB2 is the calculated changed dynamic curve radius component, and (vi) based on a specification of an adjustment to the limbal clearance curve radius of the predicate lens and changes to the dynamic curve sagittal component, the dynamic curve radius component and the limbal clearance curve sagittal component of the predicate lens are calculated to effect changes in the limbal clearance control point of the adjusted lens to be manufactured, in accordance with the algorithms
RC3=Specified
SC3=RC3−sqrt(RC3^2−(DC/2)^2−RC3−sqrt(RC3^2−(DB/2)^2)
SB3=ST−SA−SC3
and
RB3=SQRT(((DA/2)^2)+((((((DB/2)^2)−((DA/2)^2)+(SB3^2))/(2*SB3))^2))), wherein RC3 is the specified adjusted limbal clearance curve radius, SC3 is the calculated changed limbal clearance curve sagittal component, SB3 is the calculated changed dynamic curve sagittal component, and RB3 is the calculated changed dynamic curve radius component.

18. The method of claim 17, comprising performing (iv).

19. The method of claim 17, comprising performing (v).

20. The method of claim 17, comprising performing (vi).

* * * * *